(12) United States Patent
Young et al.

(10) Patent No.: US 9,350,014 B2
(45) Date of Patent: May 24, 2016

(54) NANOSCALE NICKEL-BASED CATALYTIC MATERIAL

(71) Applicant: Ovonic Battery Company, Inc., Auburn Hills, MI (US)

(72) Inventors: Kwo Young, Troy, MI (US); Benjamin Reichman, West Bloomfield, MI (US); Michael A. Fetcenko, Rochester, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 340 days.

(21) Appl. No.: 13/735,696

(22) Filed: Jan. 7, 2013

(65) Prior Publication Data

US 2014/0194279 A1 Jul. 10, 2014

(51) Int. Cl.

| | |
|---|---|
| *B01J 23/755* | (2006.01) |
| *H01M 4/24* | (2006.01) |
| *H01M 4/38* | (2006.01) |
| *H01M 4/90* | (2006.01) |
| *H01M 10/30* | (2006.01) |
| *H01M 10/34* | (2006.01) |

(52) U.S. Cl.
CPC ............... *H01M 4/242* (2013.01); *H01M 4/38* (2013.01); *H01M 4/9041* (2013.01); *H01M 10/30* (2013.01); *H01M 10/345* (2013.01); *Y02E 60/124* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 4,623,597 A | 11/1986 | Sapru et al. | |
| 4,716,088 A | 12/1987 | Reichman et al. | |
| 5,096,667 A | 3/1992 | Fetcenko | |
| 5,536,591 A * | 7/1996 | Fetcenko et al. | ............... 429/59 |
| 5,616,432 A | 4/1997 | Ovshinsky et al. | |
| 5,840,440 A | 11/1998 | Ovshinsky et al. | |
| 6,106,768 A | 8/2000 | Lee et al. | |
| 6,193,929 B1 | 2/2001 | Ovshinsky et al. | |
| 6,210,498 B1 | 4/2001 | Ovshinsky et al. | |
| 6,210,719 B1 | 4/2001 | de Lang et al. | |
| 6,740,448 B2 | 5/2004 | Fetcenko et al. | |
| 6,830,725 B2 | 12/2004 | Fetcenko et al. | |
| 6,841,512 B1 * | 1/2005 | Fetcenko et al. | ............... 502/335 |
| 2003/0148180 A1 * | 8/2003 | Fetcenko et al. | ............ 429/218.2 |
| 2005/0051244 A1 | 3/2005 | Fetcenko et al. | |
| 2005/0255382 A1 | 11/2005 | Young et al. | |

OTHER PUBLICATIONS

Young et al., Journal of Alloys and Compounds 476 (2009) 774-781; 8 pages total.
Young et al., Journal of Alloys and Compounds 506 (2010) 831-840; 10 pages total.
Young et al., Journal of Alloys and Compounds 486 (2009) 559-569; 11 pages total.

* cited by examiner

*Primary Examiner* — Colin W Slifka
(74) *Attorney, Agent, or Firm* — Dinsmore & Shohl LLP

(57) ABSTRACT

The performance of an $AB_x$ type metal hydride alloy is improved by adding an element to the alloy which element is operative to enhance the surface area morphology of the alloy. The alloy may include surface regions of differing morphologies.

13 Claims, 9 Drawing Sheets

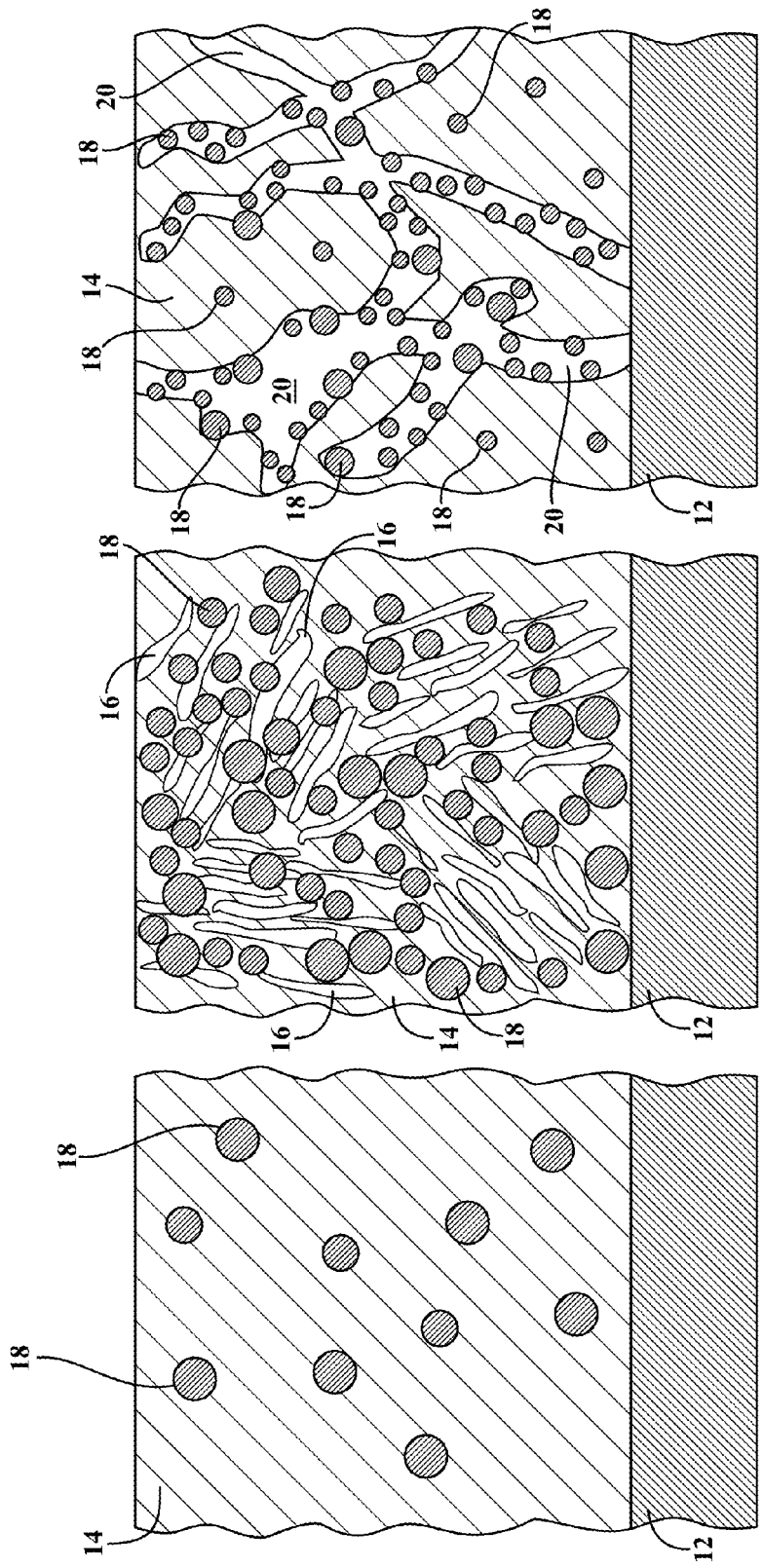

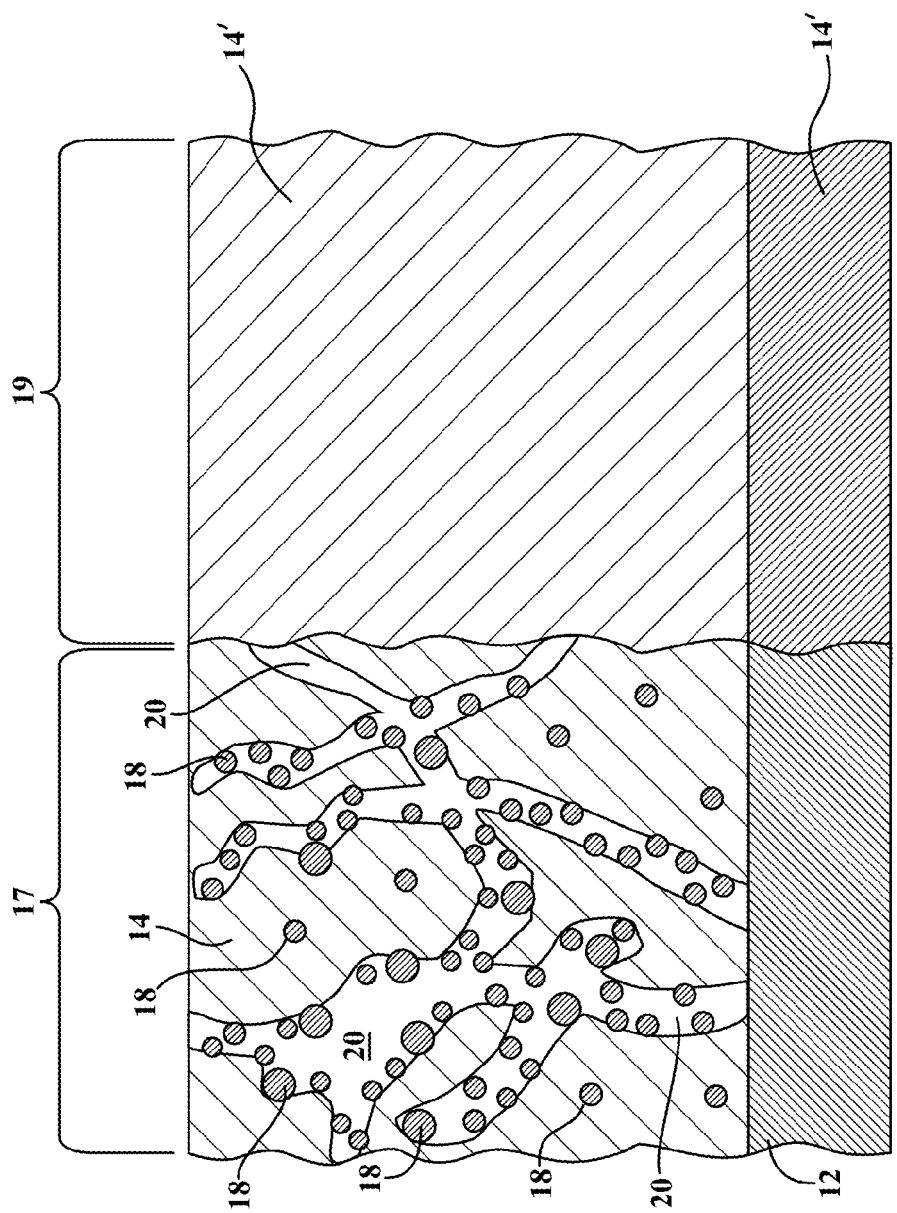

NANOSCALE NICKEL-BASED CATALYTIC MATERIAL

FIELD OF THE INVENTION

This invention relates to alloy materials and methods for their fabrication. In particular, the invention relates to nanoscale and sub-nanoscale nickel-based catalysts derived from metal hydride alloy materials, and to structures including these catalysts.

BACKGROUND OF THE INVENTION

As is known in the art, certain metal hydride alloy materials are capable of absorbing and desorbing hydrogen. These materials can be used as hydrogen storage media and/or as electrode materials for fuel cells, and metal hydride batteries including metal hydride/air battery systems.

When an electrical potential is applied between the cathode and a metal hydride anode in a metal hydride cell, the negative electrode material (M) is charged by the electrochemical absorption of hydrogen and the electrochemical evolution of a hydroxyl ion; upon discharge, the stored hydrogen is released to form a water molecule and evolve an electron. The reactions that take place at the positive electrode of a nickel metal hydride cell are also reversible. Most metal hydride cells use a nickel hydroxide positive electrode. The following charge and discharge reactions take place at a nickel hydroxide positive electrode.

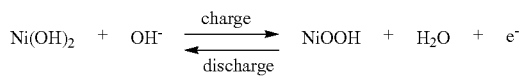

In a metal hydride cell having a nickel hydroxide positive electrode and a hydrogen storage negative electrode, the electrodes are typically separated by a non-woven, felted, nylon or polypropylene separator. The electrolyte is usually an alkaline aqueous electrolyte, for example, 20 to 45 weight percent potassium hydroxide.

One particular group of metal hydride materials having utility in metal hydride battery systems is known as the $AB_x$ class of material with reference to the crystalline sites that its member component elements occupy. $AB_x$ type materials are disclosed, for example, in U.S. Pat. No. 5,536,591 and U.S. Pat. No. 6,210,498, the disclosures of which are incorporated herein by reference. Such materials may include, but are not limited to, modified $LaNi_5$ type as well as the TiVZrNi type active materials. These materials reversibly form hydrides in order to store hydrogen. Such materials utilize a generic Ti—V—Ni composition, where at least Ti, V, and Ni are present with at least one or more of Cr, Zr, and Al. The materials are multiphase materials, which may contain, but are not limited to, one or more TiVZrNi type phases with a $C_{14}$ and $C_{15}$ type crystal structure. Some specific formulations comprise:

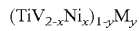

where x is between 0.2 and 1.0; y is between 0.0 and 0.2; and M=Al or Zr;

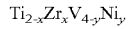

where Zr is partially substituted for Ti; x is between 0.0 and 1.5; and y is between 0.6 and 3.5; and

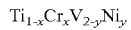

where Cr is partially substituted for Ti; x is between 0.0 and 0.75; and y is between 0.2 and 1.0.

Other Ti—V—Zr—Ni alloys may also be used for a rechargeable hydrogen storage negative electrode. One such family of materials is a specific sub-class of these Ti—V—Ni—Zr alloys comprising Ti, V, Zr, Ni, and a fifth component, Cr. In a particular instance, the alloy has the composition

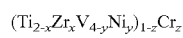

where x is from 0.00 to 1.5, y is from 0.6 to 3.5, and z is an effective amount less than 0.20. These alloys may be viewed stoichiometrically as comprising 80 atomic percent of a V—Ti—Zr—Ni moiety and up to 20 atomic percent Cr, where the ratio of (Ti+Zr+Cr+optional modifiers) to (Ni+V+optional modifiers) is between 0.40 to 0.67. These alloys may include additives and modifiers beyond the Ti, V, Zr, Ni, and Cr components.

The V—Ti—Zr—Ni family of alloys has an inherently higher discharge rate capability than previously described alloys. This is the result of substantially higher surface areas at the metal/electrolyte interface for electrodes made from the V—Ti—Zr—Ni materials. The surface roughness factor (total surface area divided by geometric surface area) of V—Ti—Zr—Ni alloys is about 10,000. This value indicates a very high surface area and is supported by the inherently high rate capability of these materials. The characteristic surface roughness of the metal/electrolyte interface is a result of the disordered nature of the material. Since all of the constituent elements, as well as many alloys and phases of them, are present throughout the metal, they are also represented at the surfaces and at cracks which form in the metal/electrolyte interface. Thus, the characteristic surface roughness is descriptive of the interaction of the physical and chemical properties of the host metals as well as of the alloys and crystallographic phases of the alloys in an alkaline environment. These microscopic chemical, physical, and crystallographic parameters of the individual phases within the hydrogen storage alloy material are believed to be important in determining its macroscopic electrochemical characteristics.

In addition to the physical nature of its roughened surface, it has been observed that V—Ti—Zr—Ni alloys tend to reach a steady state surface composition and particle size. This steady state surface composition is characterized by a relatively high concentration of metallic nickel. These observations are consistent with a relatively high rate of removal through precipitation of the oxides of titanium and zirconium from the surface and a much lower rate of nickel solubilization, providing a degree of porosity to the surface. The resultant surface seems to have a higher concentration of nickel than would be expected from the bulk composition of the negative hydrogen storage electrode. Nickel in the metallic state is electrically conductive and catalytic, imparting these properties to the surface. As a result, the surface of the negative hydrogen storage electrode is more catalytic and conductive than if the surface contained a higher concentration of insulating oxides.

In contrast to the Ti—V—Zr—Ni based alloys described above, alloys of the modified $LaNi_5$ type have generally been considered "ordered" materials that have a different chemistry and microstructure, and exhibit different electrochemical characteristics compared to the Ti—V—Zr—Ni alloys. However, analysis reveals while the early unmodified $LaNi_5$ type alloys may have been ordered materials, the more recently developed, highly modified $LaNi_5$ alloys are not. The performance of the early ordered $LaNi_5$ materials was poor. However, the modified $LaNi_5$ alloys presently in use have a high degree of modification (that is as the number and amount of elemental modifiers has increased) and the performance of these alloys has improved significantly. This is due to the disorder contributed by the modifiers as well as their electrical and chemical properties.

U.S. Pat. No. 5,536,591 considers the compositional microstructure of hydrogen storage alloys in greater detail and recognizes that the composition of hydrogen storage alloys is more complicated than is indicated by the nominal or bulk composition. Specifically, the '591 patent recognizes the importance of a surface oxide layer that is typically present in hydrogen storage alloys, and its influence on the charging and discharging processes. In electrochemically driven processes, for example, the oxide layer constitutes an interface between the electrolyte and the bulk hydrogen storage alloy and accordingly may also be referred to as an interface layer or region. Since oxide layers are typically insulating, they generally inhibit the performance of electrodes utilizing metals or metal alloys. Prior to electrochemical reaction, metal or metal alloy electrodes are typically activated, a process in which the surface oxide layer is removed, reduced or modified to improve performance. The process of activation may be accomplished, for example, by etching, electrical forming, pre-conditioning or other methods suitable for removing or altering excess oxides or hydroxides. See, for example, U.S. Pat. No. 4,717,088, the disclosure of which is hereby incorporated by reference.

The '591 patent extended the Ovshinsky principles to the oxide layer of hydrogen storage materials and thereby demonstrated improved catalytic activity. Specifically, hydrogen storage alloys having Ni-enriched catalytic regions in the oxide layer are shown to have high catalytic activity. The Ni-enriched catalytic regions may be prepared, for example, through an activation process in which elements of the hydrogen storage alloy other than Ni are preferentially corroded to provide regions of metallic nickel alloy of about 50-70 angstroms distributed throughout the oxide layer. The Ni-enriched catalytic regions function as catalytic sites having high activity. Formation of the Ni-enriched catalytic regions of the '591 patent is promoted by a pre-activation thermal annealing step. The annealing step acts to condition the surface region of a hydrogen storage alloy and renders it more susceptible to the formation of Ni-enriched catalytic regions during activation.

U.S. Pat. No. 4,716,088, the disclosure of which is incorporated herein by reference, discloses, inter alia, a process for activating metal hydride storage materials to alter the relatively thin, but very dense surface oxide interface layer separating the bulk alloy material forming the negative electrode in a nickel metal hydride battery from the electrolyte (such as KOH). In the activation process, the thin surface oxide thickens as it is further oxidized upon exposure to the electrolyte. However, the oxide also becomes more porous and thereby allows electrolyte to interact with the bulk metal and provide a pathway for the chemical reactions, specifically shuttling of hydrogen ions from the bulk metal alloy to the electrolyte.

Improving drastically on the disclosure of the '088 patent, the '591 patent drastically changes the thicker, porous surface oxide formed by the activation process taught by the '088 patent. The inventors thereof surprisingly discovered that the steady state surface oxide of the '088 patent could be characterized as having a relatively high concentration of metallic nickel. An aspect of the '591 patent is that, by subjecting the metal hydride alloy to a relative lengthy soak in KOH solution, at elevated temperature, a significant increase in the frequency of occurrence of these nickel regions as well as a more pronounced localization of these regions. More specifically, the materials of the '591 patent have enriched nickel regions of 50-70 angstroms in diameter distributed throughout the oxide interface and varying in proximity from 2-300 angstroms, preferably 50-100 angstroms, from region to region. As a result of the increase in the frequency of occurrence of these nickel regions, the materials of the '591 patent exhibit increased catalysis and conductivity.

The increased density of Ni regions in the '591 patent provides powder particles having an enriched Ni surface. Prior to the '591 patent, Ni enrichment was attempted unsuccessfully using microencapsulation. The method of Ni microencapsulation results in the deposition of a layer of Ni about 100 angstroms thick at the metal-electrolyte interface. Such an amount is excessive and results in no improvement of performance characteristics.

The enriched Ni regions of the '591 patent can be formed via the following fabrication strategy: Specifically formulate an alloy having a surface region that is preferentially corroded during activation to produce the enriched Ni regions. As stated in the '591 patent, it is believed that Ni is in association with an element such as Al at specific surface regions and that this element corrodes preferentially during activation, leaving the enriched Ni regions of the '591 patent. "Activation" as used herein and in the '591 patent refers to "etching" or other methods of removing excessive oxides, such as described in the '088 patent, as applied to electrode alloy powder, the finished electrode, or at any point in between in order to improve the hydrogen transfer rate.

The Ni-enriched catalytic regions of the '591 patent are discrete regions. The catalytic activity of the Ni-enriched catalytic regions is controllable by controlling their size, separation, chemical composition and local topology. In one embodiment of the '591 patent, the discrete Ni-enriched catalytic regions include metallic Ni particles having a diameter of 50-70 angstroms or less that are separated from each other by distances of 2-300 angstroms. The Ni-enriched catalytic regions are distributed throughout the oxide layer. The portions of the oxide layer surrounding the Ni-enriched catalytic regions or catalytic metallic Ni particles are referred to as the support matrix, supporting matrix, supporting oxide, oxide support or the like. The Ni-enriched catalytic regions are thus supported by or within the support matrix. The support matrix may include fine and coarse grained oxides and/or hydroxides of one or more of the metallic elements present in the hydrogen storage alloy composition and may also include multiple phases, some of which may be microcrystalline, nanocrystalline or amorphous.

Further improvements over the alloys of the '591 patent are disclosed in U.S. Pat. No. 6,740,448, the disclosure of which is incorporated herein by reference, wherein it is taught that superior catalysis and high rate discharge performance can be achieved by one or more of the following: 1) the catalytic metallic sites of the alloys are formed from a nickel alloy such as NiMnCoTi rather than just Ni; 2) the catalytic metallic sites of the alloys are converted by elemental substitution to an FCC structure from the BCC structure of the prior art Ni sites; 3) the catalytic metallic sites of the alloys are much smaller in size (10-50, preferably 10-40, most preferably 10-30 angstroms) than the Ni sites of the prior art alloys (50-70 angstroms) and have a finer distribution (closer proximity); 4) the catalytic metallic sites of the alloys are surrounded by an oxide of a multivalent material (containing $MnO_x$) which is believed to possibly be catalytic as well, as opposed to the ZrTi oxide which surrounded the prior art Ni sites; 5) the oxide could also be multiphase with very small (10-20 angstroms) Ni particles finely distributed in a MnCoTi oxide matrix; 6) the oxide may be a mix of fine and coarse grained oxides with finely dispersed catalytic metallic sites; 7) alloy modification with aluminum may suppress nucleation of large (50-70 angstroms) catalytic metallic sites (at 100 angstrom proximity) into a more desirable "catalytic cloud" (10-20 angstroms in size and 10-20 angstroms proximity); 8) NiMn oxide is the predominant microcrystalline phase in the oxide and the catalytic metallic sites may be coated with NiMn oxide.

The oxide surface of the alloys of the '448 patent is the same thickness as that of the prior art alloys; however, the modification of those alloys is described as affecting the oxide surface in several beneficial ways. First the oxide accessibility has been affected. That is, the additives to the alloy have increased the porosity and the surface area of the oxide. This is suggested to be caused by Al, Sn and Co. The modifiers added to the alloy are readily soluble in the electrolyte and believed to "dissolve" out of the surface of the alloy material, leaving a less dense, more porous surface into which the electrolyte and ions can easily diffuse. Second, the inventors of the '448 patent have noted that the derivative alloys have a higher surface area than the prior art alloys, and it is believed that the mechanical properties of the alloy (i.e. hardness, ductility, etc.) have been affected. This allows the material to be crushed easier, and allows for more microcracks to be formed in the alloy material during production and also easier in-situ formation of microcracks during electrochemical formation. Finally, the inventors of the '448 patent have noted that the alloys are more catalytically active than the prior art alloys. This is believed to be caused by a more catalytic active oxide surface layer. This surface layer, as is the case with some prior art materials (see for example U.S. Pat. No. 5,536,591 to Fetcenko et al.), includes nickel particles therein. These nickel particles are believed to provide the alloy with its surface catalytic activity. In the alloy of the '448 patent, the inventors believe there are a number of factors causing the instant increase in catalytic surface activity. First, the inventors believe that the nickel particles are smaller and more evenly dispersed in the oxide surface of the instant alloy materials. The nickel particles are believed to be on the order of 10 to 50 angstroms in size. Second, the inventors believe that the nickel particles may also include other elements such as cobalt, manganese and iron. These additional elements may enhance the catalytic activity of the nickel particles, possibly by increasing the roughness and surface area of the nickel catalytic sites themselves. Third, the inventors of the '448 patent believe that the oxide layer itself is microcrystalline and has smaller crystallites than prior art oxide. This is believed to increase catalytic activity by providing grain boundaries within the oxide itself along which ions, such as hydrogen and hydroxyl ions, may move more freely to the nickel catalyst particles which are situated in the grain boundaries. Finally, the instant inventors have noted that the concentrations of cobalt, manganese and iron in the oxide surface are higher than in the bulk alloy and higher than expected in the oxide layer.

The surface area of the alloy of the '448 patent increases in surface area by about a factor of four during treatment, and the higher surface area of the alloy is only partially responsible for the higher catalytic property of these alloys. As the AC impedance measurements demonstrated, the better catalytic activity of the surface of the inventive alloy also contributes to the enhanced catalytic behavior thereof.

Hence, the improved power and rate capability of the alloys of the '448 patent is suggested to be the result of the higher surface area within the surface oxide as well as improved catalytic activity within the oxide due to the smaller size and finer dispersion of the nickel catalyst particles compared to prior art materials. Observations from high resolution scanning transmission electron microscopy (STEM) included presence of nickel catalyst "clouds" having a size in the 10-30 angstrom range and extremely close proximity, on the order of 10-20 and 10-50 angstrom distance. Another contributing factor to the improved catalysis shown by the alloys of the '448 patent is the transformation of the supporting oxide in which the Ni particles reside.

In other prior art materials, the supporting oxide may be primarily rare earth or TiZr based oxides while in the case of the materials of the '448 patent, the support oxide is now comprised of at least regions of NiCoMnTi "super catalysts." This could also be NiMn regions surrounded by TiZr oxide. These super catalysts show a surprising lack of oxygen based on Electron Energy Loss Spectroscopy (EELS). It may be possible these regions are partially metallic or in a low oxidation state.

Another observation with the materials of the '448 patent is that prior art nickel catalytic regions within the oxide were BCC crystallographic orientation based on Select Area Electron Diffraction (SAED), which the inventive materials were observed to have an FCC orientation. It may be possible that the catalytic regions of Ni have been partially substituted by Co, Al, Mn, Sn, or other elements which have shifted the crystallographic orientation. It is indeed likely the BCC to FCC Ni shift reflects a higher degree of substitution. The inventors of the '448 patent theorize that it is also possible the FCC Ni in conjunction with NiCoMnTi regions and TiZr oxide may form a super lattice which may further promote ionic diffusion and reaction. Still another theory based on analytical evidence suggests that metallic Ni particles reside in a Mn oxide support. The presence of the Mn oxide is intriguing in that $MnO_x$ is multivalent and could promote catalysis via changing oxide states during the charge/discharge reactions.

Finally, another interpretation of the analytical evidence of the '448 patent suggests even a multiphase surface oxide. In addition to metallic Ni or Ni alloys, there appears to exist both a fine grained and coarse grained support oxide. It is suggested that the coarse grained aspect to the surface is dominated by TiZr prior art style oxide while the appearance of the fine grained support oxide in the materials may be the MnOx or NiMnCoTi oxide or a MnCoTi oxide.

The supporting matrix and catalytic sites thereof are further discussed in U.S. Pat. No. 6,270,719 (the '719 patent) to Fetcenko, Ovshinsky, and colleagues. The '719 patent teaches additional modification of Ni-enriched regions to provide further improvements in catalytic activity. The '719 patent teaches formation of catalytically active metal-enriched regions comprising not only metallic Ni particles, but also particles of metal alloys such as alloys of Ni with one or more of Co, Cr, V, Pt, Pd, Au, Ag, Rh, Ti, Mn, or Al as well as other metal alloys (e.g. PtAu). The '719 patent further teaches that alloying may provide particles having an FCC structure instead of the BCC structure of the metallic Ni particles of the '591 patent.

The instant invention further considers the nature of the oxide support layer of hydrogen storage alloys and is particularly concerned with extending the Ovshinsky principles to the microstructure of the support matrix in order to obtain improved performance of electrochemical and thermal hydrogen storage alloys. The performance of hydrogen storage materials is based on factors that include the intrinsic activity of catalytic sites, the number of catalytic sites, interactions between catalytic sites, interactions between catalytic sites and hydrogen storage sites, the number of hydrogen storage sites and the stability of hydrogen storage sites. These factors influence the hydrogen storage capacity, thermodynamic properties, and kinetics of hydrogen storage materials. The prior patents described hereinabove have demonstrated various ways to improve the activity of catalytic sites, the number of catalytic sites, the number of hydrogen storage sites, and the stability of hydrogen storage sites.

U.S. Pat. No. 6,830,725, the disclosure of which is incorporated herein by reference, discusses additional features of the support matrix and/or catalytic metallic regions or particles that are beneficial to the performance of hydrogen storage materials. More specifically, the '725 patent is concerned with beneficial modifications of the region at or near the surface of a hydrogen storage alloy. The region at or near the surface of a hydrogen storage alloy may also be referred to herein as the surface or interface region, surface or interface layer, surface or interface oxide or the like. The surface or interface region constitutes an interface between the electrolyte and the bulk portion of an electrochemical hydrogen storage alloy. In one embodiment of the '725 patent, the interface region includes catalytic metal or metal alloy particles having angstrom scale dimensions that are supported by a surrounding support matrix having a higher degree of porosity than with previously known metal hydride alloys. As described therein, the relative proportions of catalytic metal or metal alloy particles and support matrix in the surface region vary with the composition and processing treatments of the instant hydrogen storage alloys.

The '725 patent describes a process for tuning the microstructure of the support matrix in the interface region of hydrogen storage alloys so as to create a more open network structure that facilitates the access of reactant species to catalytic sites and the departure of product species away from catalytic sites through voids or channels in the interface region. Voids and channels of sufficient size relative to participating reactant species (in charging or discharging processes) facilitate the mobility of reactant species and may be referred to as reactant voids or channels. The presence of reactant voids or channels in the interface region of the instant alloys can lead to greater utilization of catalytic sites and improved performance, particularly at low temperature. Another aspect of the '725 patent focuses on tuning the microstructure of the interface region of hydrogen storage alloys so as to increase the density of catalytic sites. A greater number of catalytic sites in a given volume of hydrogen storage alloy leads to an increase in overall catalytic reactivity.

As will be explained in detail hereinbelow, the present invention incorporates and builds on the above-described techniques and, among other things, builds on the teaching of the prior art so as to further improve the surface morphology, and hence the three-dimensional configuration and the catalytic activity of the hydrogen storage alloy materials in general, and their surface interface regions in particular. However, the improvement taught by the instant inventors is not trivial. The analysis performed on the subject microstructurally tuned interface surface reveals that for the first time the interfacial surface layer is not the same throughout. A particle of hydrogen storage alloy material has a huge surface area and therefore a huge amount of interfacial surface exposed to the electrolyte. Heretofore, analyses of the various areas of the surface oxide revealed identical surface morphologies, i.e., approximately the same density of metallic nickel alloy particles and voids or pores or channels into the surface oxide. For the first time, applicants have changed the morphology of adjacent regions of the interfacial surface. The change in average size of the channels enhances the performance of the alloy, in particular under low temperature conditions. The alloys of the present invention may include modifiers which may hereinafter be referred to as modifying elements, microstructure tuning elements, microstructure modifiers, support matrix modifiers, supporting oxide modifiers, surface or interface region modifiers or the like. The presence of the formula modifiers in combination with other elements provides an overall alloy formulation that provides the beneficial microstructural and porosity effects of the instant invention.

In the absence of microstructure tuning according to the instant invention, the base alloys may have metal enriched catalytic regions that include catalytically active particles comprised of nickel, nickel alloy as well as other metals or metal alloys as described in the '591, '725 and '719 patents.

Microstructure tuning according to the instant invention permits control of the morphology, and in particular the three-dimensional structure, of the interface layer surrounding the catalytically active particles and thereby enhances the mobility of relevant molecules or molecular species in electrochemical or thermal charging or discharging processes with respect to the alloy material. The microstructure of the instant alloys has specifically configured voids or channels which define a three-dimensional structure that facilitates access of reactant species within the surface region as well as to and from catalytic particles or regions. The instant voids or channels include a higher density of catalytic metallic particles therein.

The characteristics and range of modifications of the support matrix surrounding the catalytic metal-enriched regions of the hydrogen storage materials of the prior art have not been fully optimized. Incidental variations of the support matrix as a result of effects intended to improve the performance or number of catalytic and hydrogen storage sites have been mentioned, but no teaching of the intentional modification of the three-dimensional morphology of the support matrix has been presented. In the '591 patent, for example, formation of Ni-enriched regions was believed to provide a somewhat more porous supporting oxide. In the '719 patent, as another example, inclusion of Mn in the bulk composition of the hydrogen storage alloy was proposed to provide a multivalent $MnO_x$ component to the oxide layer where the multivalent component may have catalytic properties.

Tuning of the three-dimensional structure and catalytic sites of the channels in the oxide interface layer of the materials of the present invention provides an additional degree of freedom for optimizing the performance of electrochemical and thermal hydrogen storage materials. In addition to the intrinsic activity, number, and interactions among and between catalytic sites, hydrogen storage sites and surrounding material described hereinabove, high performance further requires that a hydrogen bearing source such as hydrogen gas or water has accessibility to a catalytic site. The concept of accessibility further extends to the ability of byproducts formed during charging or products formed during discharging to depart catalytic sites so that the site may be further utilized.

As an example, an electrochemical hydrogen storage alloy that includes metal enriched catalytic regions may be considered wherein the alloy is included as the negative electrode of a rechargeable battery in the presence of an aqueous electrolyte. Upon charging, water accesses a metal enriched catalytic site to form atomic hydrogen for storage and a hydroxyl ion byproduct. In order for this charging process to occur, the support matrix surrounding metal enriched catalytic sites must be sufficiently open or porous to permit water molecules from the electrolyte to access the metal enriched catalytic sites. Additionally, in order to continually effect catalysis at a metal enriched catalytic site, the support matrix must permit hydroxyl ion formed during charging to migrate, diffuse or otherwise depart from the catalytic site so that the access of further water molecules to the catalytic site is not impeded or otherwise blocked by the presence of a hydroxyl ion. Similar considerations apply on discharging. Upon discharging, stored hydrogen combines with hydroxyl ions at a catalytic site to form water. In order to achieve high discharge rates, it is preferable for the support matrix to be sufficiently porous to allow for the facile departure of water molecules formed upon discharging away from the catalytic site. If the departure of water molecules is inhibited by the support matrix, the catalytic site is effectively blocked and additional discharging may be inhibited. Optimal discharging requires not only rapid formation of product, but also rapid departure or transport of products (and byproducts, if present) away from the catalytic site so that the site is available for further participation in the discharge reaction. In addition to reactants, products and byproducts, the accessibility and mobility of ions in the electrolyte to catalytic sites, hydrogen storage sites and within a hydrogen storage material may also be relevant to the overall performance and efficiency of charging and discharging reactions.

Insufficient porosity and/or an inadequate pore morphology of the support matrix may inhibit access to or departure from catalytic sites, for example, by presenting a structure having openings or channels that are too small to provide facile migration of molecular species to and/or from a catalytic site. Thus, even if a particular catalytic site (e.g. within a metal enriched catalytic region or catalytic metallic particle) has high activity, fast kinetics for charging and discharging etc., inability of reactant molecules or electrolyte species to access the catalytic site or inability of product molecules or electrolyte species to depart the catalytic sites may have a deleterious effect on the performance of a hydrogen storage material.

In addition to structural barriers associated with accessing or departing a catalytic site, a supporting matrix may also present steric, electronic or other barriers. Electronic barriers generally arise from intermolecular forces of attraction or repulsion that may be present between the support matrix and migrating or diffusing molecules or chemical species. Electrostatic, van der Waals, bonding, etc. interactions may act to impede migration or diffusion even if sufficiently large structural pathways for migration are available within the support matrix. The concept of porosity as used herein is intended to broadly encompass barriers or inhibitions, regardless of origin, provided by the support matrix to the migration or diffusion of species participating in charging or discharging processes. A highly porous support matrix provides few barriers to migration or diffusion, while a low porosity or highly dense support matrix provides substantial barriers to migration or diffusion.

The ability of a molecule or other chemical species to access or depart a catalytic site may also be referred to as the mobility of the molecule within or with respect to the support matrix. A molecule or chemical species having high mobility is readily able to penetrate, migrate through, diffuse within or otherwise transport through or within the support matrix. High mobility implies greater accessibility of reactants to catalytic sites during charging and greater ability of products to depart from a catalytic site during discharging. High mobility also implies a greater ability of byproducts to depart from a catalytic site during either or both of charging and discharging. High mobility of a species through a support matrix implies that the support matrix provides few barriers (structurally, sterically, electronically, etc.) to migration or diffusion. The transport of electrolyte species is similarly facilitated through a support matrix that provides high mobility.

Phenomenologically, species mobility and accessibility to catalytic sites may be manifested in the charge transfer resistance, particularly at low temperature, of an electrochemically driven process. Charge transfer resistance is a measure of the facility of the basic electrodic electron transfer process of an electrochemical reaction. A high charge transfer resistance implies an inhibited electron transfer process. Factors contributing to an inhibition include low number of catalytic sites, low activity of catalytic sites, or inability of relevant molecules and molecular species to access or depart catalytic sites. A highly dense oxide support matrix inhibits the charge transfer process by impeding access to and/or departure from a catalytic site. This inhibition contributes to a large charge transfer resistance and slows the kinetics of an electrochemical process. As the porosity and three-dimensional morphology of the material increases, the charge transfer resistance decreases as species mobility and accessibility to catalytic sites improves. As porosity and morphology are optimized, the support matrix is no longer the dominating factor in determining the charge transfer resistance. Instead, the number and/or activity of catalytic sites or the concentration of reactive species may become controlling.

The mobility of a molecule or other molecular species with respect to a support matrix may be influenced by external factors such as the temperature. Temperature is a relevant consideration because it controls the thermal energy of a molecule. Higher temperatures provide higher thermal energies to molecules and molecular species that access or depart from a catalytic site thereby better enabling them to overcome structural, steric, electronic or other barriers to mobility created by a support matrix. A support matrix that provides sufficient mobility at one temperature with respect to a particular charging or discharging process may not provide sufficient mobility at a lower temperature because of a reduction of thermal energy available to one or more molecules or molecular species requiring access to or departure from a catalytic region. The thermal energy of mobile molecules or species relative to the activation energies of barriers to mobility provided by the support matrix influences the effectiveness of charging and discharging.

The instant invention provides hydrogen storage materials having a preferred three-dimensional support matrix micro and macrostructure and a catalytic ability that enhances the mobility of relevant molecules and molecular species. Mobility enhancements are provided at elevated temperatures, room temperature and low temperatures. Mobility enhancements are provided by the inclusion or formation of specifically configured, catalytically active channels in the surface region of the alloy. In a preferred embodiment, an instant hydrogen storage material is utilized as the active material in the negative electrode of a nickel metal hydride battery that provides superior discharge kinetics at temperatures below 0° C.

In addition to porosity modifications, accelerated and directed preferential corrosion may also lead to a relative local enhancement, at or in the vicinity of the surface, of the concentration of one or more elements that are less susceptible to corrosion. As in the patents incorporated by reference hereinabove, local enhancements in the concentrations of one or more metals may facilitate the formation of metal enriched regions that include catalytic metallic particles.

While not wishing to be bound by theory, the instant inventors believe that the improved morphology of the channel structure of the interface layer and/or increased density and/or optimized size of catalytic metallic particles afforded by the instant invention may, at least in some embodiments of the instant hydrogen storage alloys, occur synergistically. That is, an increase in the porosity and three-dimensional structure of the support matrix may promote the formation of catalytic metallic particles and vice versa. Rather than merely providing local metal enriched regions that include catalytic particles supported on an oxide matrix as in the prior art, the instant invention provides a support matrix comprising a series of convoluted, interconnected voids or channels defining a three-dimensional, sponge-like morphology. In addition, at least portions of the interior surfaces of these interconnected channels are catalytically active and as such include a number of catalytic metallic particles therein.

A key operative feature of the present invention is to provide access between the voids and the catalysts. It is also possible that the introduction of one or more non-modifier elements and/or implementation of one or more chemical processes may also operate to provide the beneficial three-dimensional structural and porosity effects of the instant invention. Such elements and processes can include chemical pretreatments designed to selectively attack one or more of the support oxide elements. For example, HF may provide the final desired oxide porosity. The reader must understand that the subject invention defines, in numerous ways, over the invention disclosed by the assignee in the '725 patent, the disclosure of which applicant considers the closest prior art. First, the increased porosity is due to not only a change in the cross-sectional size of the channels, but also to the three-dimensional shape of those channels as they extend through the surface oxide. While applicant has provided analysis describing channel size, it is to be understood that the size of the openings will vary based on alloy formulations and processing conditions such as preferential corrosion concentrations, duration and temperature. In other words, applicants have supplied additional micro and macrostructural tuning tools that those of ordinary skill in the art may use. Second, the large, three-dimensional channels have the catalytic, metallic nickel alloy particles distributed therethroughout, and a structure of this type is not shown, taught, or obvious from a review of the '725 patent. Third, additional modifiers present in the bulk alloy may now be found in the metallic nickel alloy particles. These are not trivial differences; applicants themselves were surprised to learn of the existence thereof when conducting TEM analysis to understand the reason for the improved electrochemical results they had seen. The electrochemical results due to the vastly improved micro and macrostructure and catalytic activity of the materials of the subject invention move NiMH batteries into the forefront of battery technology with a huge operational temperature range due in part to the large, three-dimensional channels and the ability to accept and deliver huge current densities due to the improved catalysis of the nickel alloy particles which cover the exterior and interior of the surface oxide.

Hydrogen storage materials suitable for microstructure tuning according to the instant invention include base hydrogen storage alloys comprising one or more transition metals or rare earths as well as base alloys in combination with a microstructure tuning element. Base alloys having the formula types AB, $AB_2$, $AB_5$, or $A_2B$ and mixtures thereof are within the scope of the instant invention where components A and B may be transition metals, rare earths or combinations thereof in which component A generally has a stronger tendency to form hydrides than component B.

In the base AB hydrogen storage compositions, A is preferably Ti, Zr, V or mixtures or alloys thereof and B is preferably selected from the group consisting of Ni, V, Cr, Co, Mn, Mo, Nb, Al, Mg, Ag, Zn or Pd and mixtures or alloys thereof. Base AB compositions include ZrNi, ZrCo, TiNi, and TiCo as well as modified forms thereof. Representative base AB compositions and modified forms thereof within the scope of the instant invention include those described in U.S. Pat. Nos. 4,623,597; 5,840,440; 5,536,591; and 6,270,719 incorporated by reference hereinabove as well as in U.S. Pat. No. 5,096,667, the disclosure of which is hereby incorporated by reference.

Base $A_2B$ compositions include $Mg_2Ni$ as well as modified forms thereof according to the Ovshinsky principles in which either or both of Mg and Ni is wholly or partially replaced by a multi-orbital modifier.

Base $AB_2$ compositions are Laves phase compounds and include compositions in which A is Zr, Ti or mixtures or alloys thereof and B is Ni, V, Cr, Mn, Co, Mo, Ta, Nb or mixtures or alloys thereof. The instant invention also includes base $AB_2$ compositions modified according to the Ovshinsky principles described hereinabove. Representative base $AB_2$ compositions within the scope of the instant invention are discussed in U.S. Pat. No. 5,096,667 incorporated by reference hereinabove.

Base $AB_5$ compositions include those in which A is a lanthanide element or a mixture or alloy thereof and B is a transition metal element or a mixture or alloy thereof. $LaNi_5$ is the prototypical base $AB_5$ compound and has been modified in various ways to improve its properties. Ni may be partially replaced by elements including Mn, Co, Al, Cr, Ag, Pd, Rh, Sb, V, or Pt, including combinations thereof. La may be partially replaced by elements including Ce, Pr, Nd, or other rare earths including combinations thereof. Mischmetal may also wholly or partially replace La. The instant invention also includes base $AB_5$ compositions modified according to the Ovshinsky principles described hereinabove. Representative base $AB_5$ compositions within the scope of the instant invention have been discussed in U.S. Pat. Nos. 5,096,667 and 5,536,591 incorporated by reference hereinabove.

Modified Mg-based alloys such as those described in U.S. Pat. Nos. 5,616,432 and 6,193,929, the disclosures of which are hereby incorporated by reference, are also within the scope of the instant invention.

The base alloys of the instant invention may also comprise non-stoichiometric compositions achieved through application of the Ovshinsky principles. Non-stoichiometric compositions are compositions in which the ratio of elements may not be expressible in terms of simple ratios of small whole numbers. Representative non-stoichiometric compositions include $AB_{1\pm x}$, $AB_{2\pm x}$, $AB_{5\pm x}$, and $A_2B_{1\pm x}$, where x is a measure of the non-stoichiometric compositional deviation. The base alloys of the instant invention may also comprise multiphase materials where a multiphase material is a combination or mixture of materials having different stoichiometries, microstructures and/or structural phases. Structural phases include crystalline phases, microcrystalline phases, nanocrystalline phases and amorphous phases.

In some embodiments, increased support matrix porosity and/or increased density of catalytic metallic particles results from inclusion of a modifying element in the base alloy composition. In other embodiments, inclusion of a modifying element in combination with a reduction in the amount of one or more elements of the base alloy composition provides increased porosity of the support matrix and/or increased density of catalytic metallic particles. In still other embodiments, microstructure tuning occurs through formation, processing, treatment, activation or operation steps as described hereinabove.

The instant hydrogen storage alloys may be prepared by a variety of methods that include melt casting, induction melting, rapid solidification, mechanical alloying, sputtering and gas atomization. An important aspect of the preparation process of many hydrogen storage alloys is a post-formation annealing step in which the material as formed during preparation is subjected to an annealing treatment. The annealing treatment includes heating the material to an elevated temperature for a sufficient period of time. An effect of annealing is to alter or condition the surface of the hydrogen storage material in such a way that the material is susceptible to or responsive to the accelerated and directed preferential corrosion process described hereinabove that leads to formation of angstrom scale catalytic metal or metal alloy particles and greater void volume fraction of, and improved three-dimensional morphology in the surface region. The extent to which accelerated and directed preferential corrosion forms angstrom scale catalytic particles during activation is influenced by the local composition at or near the surface. In the materials of the '591 and '719 patents incorporated by reference hereinabove, local nickel enrichment in the surface region was observed to enable or facilitate formation of angstrom scale catalytic nickel or nickel alloy particles upon activation. A suitable annealing step induces a condition in the surface region in which the nickel concentration is enriched relative to the statistical concentration expected from the formula unit of the hydrogen storage alloy. Annealing under appropriate conditions initiates a segregation of nickel away from the bulk and toward the surface region to provide a nickel enriched surface region.

While not wishing to be bound by theory, the instant inventors believe that formation of a surface region having a sufficiently high nickel concentration enables formation of angstrom scale catalytic nickel or nickel alloy particles upon activation. In addition to a high nickel concentration, a nickel enriched surface region may also include microstructural features that facilitate formation of angstrom scale catalytic nickel or nickel alloy particles. The annealing induced segregation, for example, may be accompanied by local changes in phase, structure, crystallinity, grains, interfaces, etc. in the surface region that may be conducive to formation of angstrom scale catalytic nickel or nickel alloy particles during activation. In connection with the materials of the '591 patent, the instant inventors have demonstrated that angstrom scale catalytic nickel or nickel alloy particles do not form upon activation of materials that have not been subjected to an annealing step. Instead of unoxidized metallic nickel or nickel alloy particles, the surface region of unannealed materials comprises oxidized nickel in the form of an $Ni^{n+}$-rich oxide phase.

The segregation effect observed upon annealing the materials of the '591 patent is believed to be enhanced under the influence of microstructure tuning as described for example in the '725 patent. Inclusion of a microstructure tuning element, for example, may lead to greater segregation of nickel and a greater local enrichment of nickel concentration in the instant hydrogen storage alloys relative to the hydrogen storage alloys of the '591 or '719 patents. A local enrichment of other metals such as Co or a microstructure tuning element itself may also occur.

Nickel metal hydride batteries are replacing nickel cadmium batteries in a large number of applications, owing to environmental concerns and their generally improved performance characteristics. It is to be noted that for purposes of this disclosure the terms "batteries" and "cells" will be used interchangeably when referring to one electrochemical cell, although the term "battery" can also refer to a plurality of electrically interconnected cells.

While nickel cadmium batteries are generally inferior to nickel metal hydride batteries in most regards, they do exhibit superior performance characteristics at ultra-low temperatures (typically −30° C. and below). Consequently, a number of attempts have been implemented in the prior art to improve the ultra low-temperature performance of nickel metal hydride batteries. These prior art approaches generally involve the modification of the base alloy with one or more microstructure tuning elements that act to favorably tailor the properties of the supporting matrix to provide a higher concentration of catalytic metallic particles as well as greater accessibility of reactive species to the catalytic metallic particles. The microstructure tuning elements facilitate an accelerated and directed preferential corrosion of the support matrix during activation or operation to provide a more porous and accessible support matrix that also includes locally enriched concentrations of catalytic metallic particles distributed throughout the surface region of the instant hydrogen storage alloys. As the support matrix becomes more porous and less oxidic, the catalytic metallic particles may become at least partially self supporting. The microstructure tuning elements include Cu, Fe, Al, Zn and Sn. In general, the results achieved in the prior art by such approaches were somewhat limited and were primarily restricted to those metal alloys belonging to the $AB_5$ class.

Presently, there is significant interest in utilizing $AB_2$ type alloys in metal hydride battery systems, due to the fact that $AB_2$ type materials, unlike $AB_5$ alloy materials, generally do not incorporate significant amounts of expensive rare earth elements. Furthermore, batteries incorporating $AB_2$ materials utilizing lightweight metals generally exhibit high gravimetric storage capacities. However, the art has not yet found methods or materials for increasing the ultra low-temperature performance of $AB_2$ type alloy materials. Hence, it will be appreciated that there is a need in the art for methods and materials which can (1) improve the low-temperature performance of the general class of $AB_x$ type alloy materials; and (2) there is a particular need for methods and materials which can specifically improve the performance of $AB_2$ type metal hydride alloy materials at ultra low-temperatures.

As will be explained hereinbelow, the present invention is directed to $AB_x$ type metal hydride alloy materials which include modifier elements therein which operate to increase the surface area and/or catalytic ability of the alloy so as to thereby increase their low-temperature electrochemical performance in rechargeable battery cells. These and other advantages of the invention will be apparent from the drawings, discussion, and description which follow.

SUMMARY OF THE INVENTION

Disclosed is a method for improving the low-temperature electrochemical performance of an $AB_x$ ($1 \leq x \leq 5$) type metal hydride alloy which is incorporated into a rechargeable battery. The method comprises the step of adding an element to the alloy which element is operative to increase the surface area and/or catalytic ability of the alloy. In particular instances, the element increases the surface area of the alloy by a factor of greater than 2, and the catalytic ability of the alloy by more than 20%. In some instances, the element increases the surface area of the alloy by a factor of at least 4; and in particular instances, the element acts to increase both the surface area and the catalytic activity of the alloy. The element may, in some instances, be selected from the group consisting of Si, Mo, Y, Sn, Sb, and combinations thereof; and in particular instances the element comprises Si. The amount of the element is greater than zero, and typically is at least 0.1 atomic percent, and in particular instances at least 0.5 atomic percent. In some instances, the element comprises up to 10 atomic percent of the alloy, and in particular instances, the amount of the element ranges up to 5 atomic percent of the alloy.

The alloy may comprise an $AB_2$ alloy, an $AB_5$ alloy, an $A_2B_7$ alloy, as well as combinations thereof. In particular instances, the alloy is an $AB_2$ Laves phase alloy. The alloy may comprise a nickel metal hydride alloy and the element may substitute for a portion of the nickel in the alloy.

In some instances, the additive promotes preferential corrosion and/or other structural rearrangements and enables the formation of a particular surface microstructure which comprises channel or tunnel-like passages having highly catalytic sites disposed thereupon.

Further disclosed are particular materials made by the method of the present invention. These materials may have a uniform bulk composition or they may be composites of two or more different types of alloys. Also disclosed are battery structures including the alloys and composites of the present invention.

Another aspect of the subject invention is a novel hydrogen storage alloy material for a rechargeable battery, said material comprising a bulk alloy and an interface layer on the exposed surfaces thereof, said interface layer comprising at least two adjacent regions, each adjacent region of the interface layer having a morphology which differs from the morphology of at least one of another of said at least two regions. In particular instances, the morphologies are selected from the group consisting of: a structure without catalyst material, a structure with a catalyst material, a porous structure with a catalyst material, a porous structure comprising a plurality of interconnected channels not having a catalytic material disposed in said channels, and a porous structure comprising a plurality of interconnected channels having a catalytic material disposed in at least a portion of said channels.

In a further significant invention disclosed herein, we describe a storage material for a rechargeable battery, said material comprising a multi-element bulk alloy material with an interface layer on the exposed surfaces thereof. The bulk alloy has more than one phase and the interface layer comprises at least two adjacent regions, each adjacent region of the interface layer has a morphology and/or chemical composition which differs from the morphology and/or chemical composition of at least one of another of said at least two regions and each of the differing regions is associated with one of the phases of the bulk alloy material.

BRIEF DESCRIPTION OF THE DRAWINGS

FIG. 1 is a schematic depiction of the microstructure of a hydride material of the prior art;

FIG. 2 is a schematic depiction of the microstructure of another hydride material of the prior art;

FIG. 3A is a schematic depiction of the microstructure of a first material of the present invention;

FIG. 3B is a schematic depiction of another material of the present invention comprising a plurality of regions of differing microstructure;

DETAILED DESCRIPTION OF THE PREFERRED EMBODIMENTS

Figure 3C:
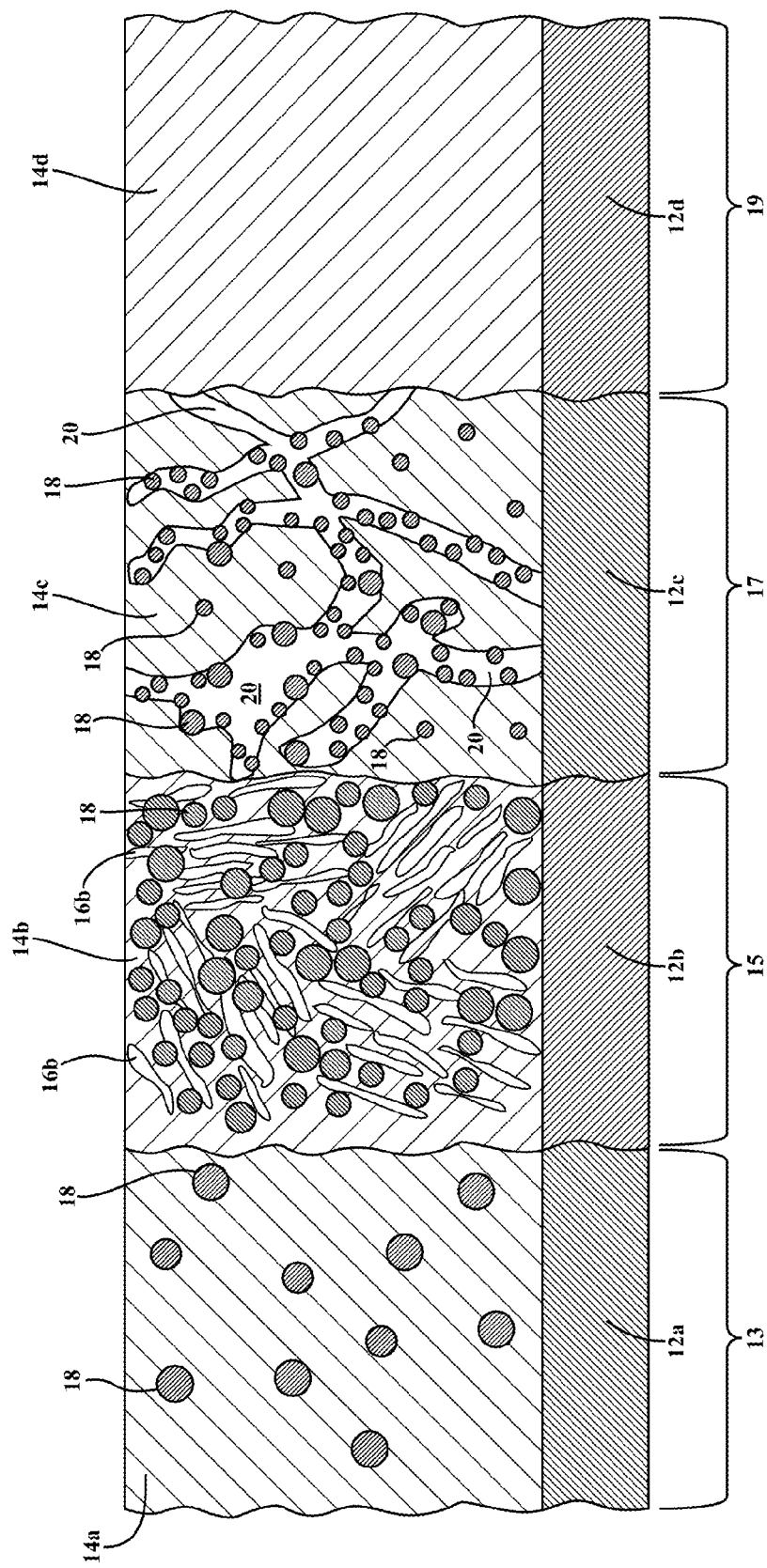
FIG. 3C is a schematic depiction of yet another material of the present invention comprising a plurality of regions of differing microstructure.

The present invention is directed to metal hydride alloy materials of the $AB_x$ type, and in some particular instances $AB_2$ type metal hydride alloy materials, which manifest improved ultra low-temperature electrochemical properties when incorporated into metal hydride battery cells. It is to be understood that within the context of this description, the hydrogen storage alloy material of the present invention may be of a single chemical composition which is present in one or more phases, or the alloy material may be a composite of two or more differing chemical compositions. The alloys of the present invention include modifier elements therein which control their morphology and/or provide for the improved low-temperature performance. While not wishing to be bound by speculation, the inventors hereof believe that the modifier elements act to expand the lattice of the alloy material and/or increase the surface area of the alloy material, and/or enable the formation of particular surface morphologies. Alternatively, or in addition, the presence of the modifier element increases the catalytic activity of the alloy material in the metal hydride battery cell. In specific instances, the surface area of the alloy is increased by a factor of more than twofold, and in some instances more than fourfold, and in some particular instances by at least fivefold. The catalytic activity of the material is increased by more than 20%. While not wishing to be bound by speculation, it is postulated that the increase in catalytic activity is at least in part a result of morphologies resultant from the lattice expansion and/or the increase in the surface area of the alloy.

It has been found that in some instances, materials of the present invention manifest a microstructure characterized by the presence of a number of tunnel-like channels or wormholes therein. These channels have a cross-sectional dimension which is approximately 25-150 angstroms, and in some instances 50-150 angstroms, and in specific instances approximately 100 angstroms. In some instances, the channels may be approximately circular in cross-section; while in other instances, they may be of a more irregular shape, such as an oval shape, or a somewhat flattened shape. For this reason, their width dimension is characterized as a cross-sectional dimension rather than as being a diameter. And, it is to be understood that this term is meant to be interpreted inclusively with regard to circular cross sections as well as more irregular cross-sections.

These channels commence at the free surface of the alloy material and at least some of them extend into the bulk of the metal alloy. The channels exhibit a three-dimensional structure whereby the channels are at least partially interconnected so as to form a network defining a sponge-like morphology. Microanalysis indicates that the channels include a relatively high density of catalytic sites disposed upon their walls. These sites are nickel rich and comprise metallic nickel and/or nickel compounds such as nickel oxides.

While not wishing to be bound by speculation, the inventors hereof believe that this novel channel and catalyst structure is responsible for the high degree of catalytic activity manifested by the materials of the present invention. In this regard, the three-dimensional, interconnected nature of the channels provides direct exposure of the catalyst particles contained therein to a continuous, high volume flow of electrolyte and reactive species contained therein. The channel structure also allows for the high volume flow of the electrolyte and reactive species to the bulk metal of the alloy. In this manner, the activity and efficiency of the catalyst is greatly increased, as compared to prior art structures in which much of the catalytic material is detrimentally shielded by the oxide component of the surface interface layer. It is also presumed that the configuration and nature of these tunnel-like catalytic channels is at least in part responsible for the enhanced low temperature performance of the alloy materials of the present invention. Under low temperature conditions the electrolyte material of a battery system greatly increases in viscosity (and in some instances freezes) and thereby impairs the mobility of electrochemically active species such as hydrogen, $H^-$, $OH^-$ and the like, preventing them from contacting active sites. The high volume electrolyte flow achieved through the morphology of the present invention sustains mobility of the active species, which with the enhanced catalytic activity of the present materials provides for enhanced low-temperature operation.

Prior art materials of the type discussed above may also manifest voids or other such features which increase the surface area of the material; however, these features are typically in a size range of 5-20 angstroms, and do not exhibit the three-dimensional interconnected morphology of the materials of the present invention, and do not manifest the presence of catalytic sites therein. As such, prior art materials such as those of the '725 patent are in contrast to the larger diameter, tunnel-like, catalytic channels of the materials of the present invention.

FIGS. 1 and 2 are schematic depictions of the surface microstructure of materials of the prior art. FIG. 3A is a schematic depiction of the surface microstructure of a generalized material of the present invention, and FIGS. 3B and 3C are schematic depictions of the surface microstructure and macrostructure of some materials of the present invention which include adjacent regions having differing microstructures.

FIG. 1 shows a prior art nickel metal hydride material of the type shown in the U.S. Pat. No. 5,536,591, which comprises a bulk alloy portion 12 of the nominal material composition. Disposed atop the bulk alloy portion is a body of surface material which comprises, as a majority, a mixed body of oxides 14 of the various metals comprising the bulk 12. The figure shows this oxide body 14 as being a uniform field; however, it is to be understood that the microstructure of the material may include regions of varying concentration. Disposed within the oxide body 14 are a number of catalytic sites 18 which are generally believed to comprise clusters of a metallic material such as a nickel-based material. As such, these clusters may comprise elemental nickel and/or nickel oxides or the like. As discussed above, this oxide body is somewhat permeable to electrolyte materials; however, even upon microscopic analysis, no pore or channel structure is apparent, and as such, these types of materials are considered to have only "threshold porosity." Hence, their catalytic sites are at least somewhat shielded from direct contact with the electrolyte material, thereby inhibiting catalytic activity.

FIG. 2 is a schematic depiction of a section of a later generation material of this type, as for example material shown in U.S. Pat. No. 6,830,725. As in FIG. 1, the material includes a bulk alloy portion 12 as well as a surface oxide portion 14. It will be noted that the oxide portion 14, also includes a number of pores or voids 16 therein. These voids greatly increase the surface area of the oxide portion 14. The voids 16 of the FIG. 2 material communicate, in some instances, with the top surface of the oxide body 14; however they are relatively linear structures and in that regard can be considered to have an essentially two-dimensional macrostructure. Disposed within the oxide body 14 of the FIG. 2 material are a number of catalytic sites 18, which are generally similar to those previously described. As will be seen from FIG. 2, the elongated, two-dimensional voids 16 of the FIG. 2 material tend to communicate, at least to some degree, with the catalytic sites 18, and it is believed that they thus allow for better access of the catalytic sites to reactive species such as hydrogen, hydrogen ions, and hydroxyl ions as compared to the FIG. 1 material.

Referring now to FIG. 3A, there is shown a corresponding schematic depiction of a material of the present invention. As in FIGS. 1 and 2, the material includes a bulk alloy portion 12 and an oxide body 14 disposed upon an outer surface thereof. However, the material of FIG. 3A includes a series of catalytically active channels (also referred to as "tunnels" or "wormholes") defined through the surface oxide body 14. These channels 20 are, at least to some degree, in communication with one another and form a network defining a three-dimensional macrostructure which communicates with an exterior surface of the material and with the bulk metal alloy. The channels 20 of FIG. 3A are generally of a greater cross-sectional dimension than are the voids of the prior art material of 2; furthermore, the catalytically active sites 18 are disposed, at least in part, on the interior walls of the channels 20. In particular aspects of the present invention, the catalytic sites 18 are much smaller than those of the prior art. In this regard, the catalytic sites may range in size from 5 to 15 Angstroms, and in some particular instances they will be smaller than 10 Angstroms. The presence of such small catalytic sires is not shown or suggested in the prior art, and is believed to be at least in part responsible for the high degree of catalytic activity manifested by the materials of the present invention.

The three-dimensional morphology of the material of FIG. 3A allows for greatly enhanced access of reactive species to the catalytic sites and to the bulk of the alloy thereby enhancing and facilitating electrochemical reactions so as to enhance the performance, and particularly the low temperature performance, of the alloy material. In this way, the channels 20 and catalytic sites 18 cooperate and interact synergistically to define macrocatalytic sites which enhance the performance, and particularly the low temperature performance, of the material.

In some instances, the catalytically active channels are uniformly dispersed across the entire surface of the alloy material. It is significant that in other embodiments of the invention, the channel features are present in spaced apart regions of the material and as such can be considered to be discrete macrocatalytic sites which function as activation centers which enhance the properties of the remainder of the alloy such as its low temperature operation or its discharge rate. While not wishing to be bound by speculation, the inventors hereof believe that the presence of such discrete, spaced apart sites of differing surface morphology may be the result of the presence of regions of differing structure and/or composition in the bulk of the materials of the present invention. For example the material may comprise a first number of regions of a highly channeled $AB_2$ material interspersed with regions of a non-channeled or lesser channeled material such as an $AB_5$ material. In other instances the differing regions may be different phases of a Laves phase material. In some instances the degree of crystallinity of the regions may differ. For example some of the regions may be crystalline or microcrystalline, while the others may be amorphous. Such structural and/or compositional differences will produce different surface morphologies upon activation. Materials embodying this particular aspect of the present invention stand in further contrast to materials of the prior art, such as those of the '725 patent, wherein the surface morphology of the alloy and its interface layer is essentially homogeneous thereacross.

The inventors hereof note that analyses of the alloys of the prior art, such as the alloys of the '725 patent and the other patents discussed above, shows that the surfaces of such alloys are homogeneous with regard to their microstructure. That is to say, any one region of the surface of prior art alloys is essentially identical to any other region with regard to the presence of pores, channels, catalytic sites, and the like. The only way in which discrete areas of differing morphologies could possibly be created in the prior art would be by some type of differential treatment protocol involving patterning, masking, or the like; and the inventors hereof are not aware of any such treatments being shown or discussed in the prior art. While not wishing to be bound by speculation, the inventors hereof believe that the presence of the modifier elements can foster the creation of different phases in the material. These phases differ in composition and/or structure, and when they are exposed to activating conditions they form regions having different surface morphologies. Hence, in the materials of the present invention some regions of the surface interface layer may have a three-dimensional highly catalytic channel morphology, while other regions may be pore free or they may have a threshold porosity or they may have a two-dimensional pore morphology. Some of the aforedescribed macrocatalytic sites may, as a result of highly enhanced electrochemical activity, act as localized heating sites which function to initiate the electrochemical activity of the bulk of the material and/or maintain fluidity of the electrolyte thereby enhancing the low temperature performance of the bulk of the alloy.

Referring now to FIG. 3B, there is shown a schematic depiction of the micro and macrostructure of an alloy material of the present invention which includes regions having a different microstructure, in particular of the surface interface layer. As will be seen, the material includes a first region 17 which has a surface interface layer having a morphology generally similar to that described with regard to FIG. 3A. As in FIG. 3A, this surface interface layer is formed upon a body of bulk material 12 and includes a plurality of three-dimensionally structured catalytic channels 20 having catalytic sites 18 defined thereupon. As in the FIG. 3A embodiment, the bulk oxide material 14 may also include some catalytic sites 18 defined therein in particular instances. Adjacent to the first region 17 is a second region 19 comprising a body of oxide material 14' formed upon a body of bulk alloy material 12'. As noted above, the composition of the bulk alloy 12' in this second region and/or its crystalline structure will differ from that of the bulk alloy 12 in the first region 17. As a consequence of these differences, the morphology of the surface oxide layer 14' in the second region 19 will differ from that morphology of the surface oxide layer 14 in the first region 17. As will be seen from the figure, the body of oxide 14' in the second region 19 does not include any channels. However, while not manifesting any discrete voids it may have threshold porosity. Also, the material 19 does not include any discrete catalytic sites, such as the sites 18 in the prior figures; although it may include some catalytic material such as nickel dispersed therein. As discussed above, applicants believe that the differences in morphologies are attributable to differing behaviors of the two regions when they are exposed to activating conditions. As discussed above, the highly channeled catalytically active high surface area portions 17 can function as macrocatalytic sites which enhance the properties, such as the low temperature properties, of the entire bulk alloy.

Yet other morphologies are possible within the scope of the present invention; and FIG. 3C is a schematic depiction of the morphology of an alloy material of the present invention which includes four separate regions 13, 15, 17, and 19. In the FIG. 3C embodiment, the first region 13 is formed upon a body of bulk alloy material 12a and has a surface morphology generally similar to that of FIG. 1 insofar as it includes a body of bulk surface oxide material 14a having catalytic sites 18, as previously described, formed therein. Adjacent thereto is a second region 15 formed upon a body of bulk alloy material 12b, and this second region comprises a surface oxide 14b which is generally similar to the surface oxide of FIG. 2 and in that regard includes a number of relatively small, elongated channels having a two-dimensional geometry formed therein, together with a number of catalytic sites 18 which, in some instances, may communicate with the channels 16b.

The material of FIG. 3C includes a third region 17 formed upon a body of bulk alloy material 12c having a surface oxide layer 14c formed thereupon and having a microstructure generally similar to that shown in FIG. 3A. The surface oxide layer 14c of the third region 17 may, as in the previous embodiments, also include some catalytic sites 18 in the bulk thereof. The material further includes a fourth region 19 formed upon a bulk alloy material 12d and further includes a fourth body of oxide material 14d formed thereupon. The oxide layer of this region is of a configuration generally similar to that shown in FIG. 3B and does not include any discrete catalytic sites or pores therein.

As in the FIG. 3B embodiment, the bulk alloy material portions 12a-12d will differ with regard to chemical composition and/or crystalline structure and hence will operate to form different surface oxide layers. While FIG. 3C shows an alloy material of the present invention including four different adjacent regions disposed in a particular order, it is to be understood that this structure is illustrative. Materials of the present invention may include a greater or lesser number of separate regions, and the ordering of those regions may likewise differ. It is a significant feature of the present invention that it provides for the capability of tailoring a material to include regions with very different structures and properties which thereby allows for the overall property of the material to be tuned to achieve particular performance characteristics. For example, an alloy material of the present invention may be configured to include a number of sites which foster low temperature performance together with a number of sites which provide for a high discharge capacity and/or a number of sites which provide for a high density of power storage.

In some instances, principles of the present invention may also be used to fabricate composites of a highly channeled, macrocatalytic alloy material dispersed in the bulk of a metal hydride material which may be of the same base composition as the highly channeled material or may be of a different composition. Such embodiments are also within the scope of this invention. For example, the principles of the present invention may be employed to prepare a highly channeled body of an $AB_2$ metal hydride material which in turn is dispersed throughout the bulk of an $AB_x$ material such as an $AB_5$ material or another $AB_2$ material.

Figure 4A:
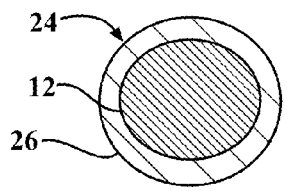
FIG. 4A is a schematic depiction of a particle of a material of the present invention.
Figure 4B:
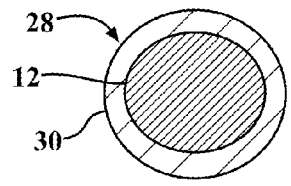
FIG. 4B is a schematic depiction of a particle of a conventional metal hydride material.

Referring now to FIG. 4A, there is shown a schematic depiction of a particle 24 of a highly channeled macrocatalytic material of the present invention which, as described with reference to FIG. 3A, includes a bulk portion 12 and an external surface 26 which includes the catalytically active channels defined therein. As described herein, these channels can be formed by treating the material with an etching agent such as an alkaline material. FIG. 4B shows a particle 28 of a secondary material 28 which comprises a bulk alloy portion 12 which may be of the same, or different, composition as the bulk alloy portion of the material of FIG. 4A. As described above, the bulk alloy portion 12 will have a surface layer 30, typically of an oxide material, in accord with the prior art.

The particles 24 and 28 of FIGS. 4A and 4B respectively may be then combined to form a bulk material, the properties of which may be controlled by controlling the relative proportions of the two particles. In this regard, highly catalytic materials having good low-temperature performance characteristics may be mixed with less active materials having good bulk storage capacity so as to optimize the low temperature performance and efficiency.

Figure 5A:
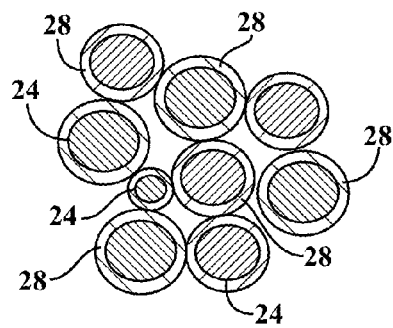
FIGS. 5A-5E are schematic depictions of composite metal hydride materials in accord with the present invention.
Figure 5B:
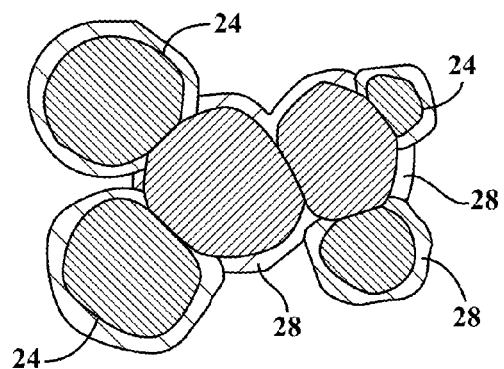
Figure 5C:
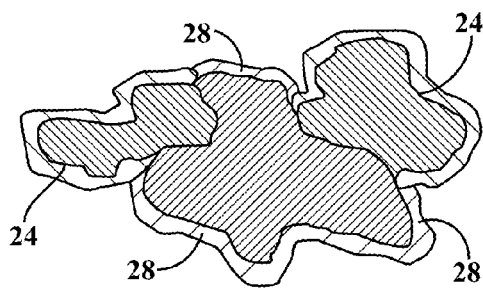
Figure 5D:
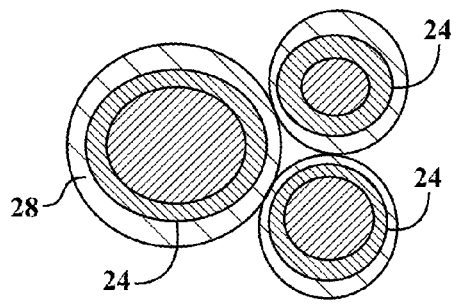
Figure 5E:
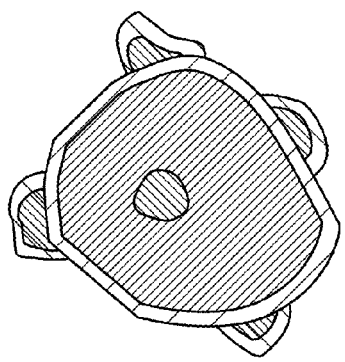

The particles may, in some instances, be simply mixed together physically so as to provide the bulk material as is shown in FIG. 5A. In other instances, the mixture may be at least partially sintered as shown in FIG. 5B. In yet other instances, mechanical alloying processes such as ball milling, impact milling, attritor milling, and the like may be utilized to at least partially alloy the particles mechanically. In yet other instances, plasma spraying techniques may be employed to produce a composite material as shown in FIG. 5C. In this regard, particles of a first one of the materials may be plasma sprayed onto particles of the second one of the materials; or in a variation of the process, a plasma spray of one material may be impacted with a plasma spray of another so as to produce a composite. In yet other instances, a process such as electroplating or electroless plating may be employed to deposit a layer of the active material of the present invention atop a body of conventional prior art material so as to at least partially coat that body and provide it with catalytically active surfaces. In yet another approach as is shown in FIG. 5E, a composite may be prepared by melting one of the components and dispersing the other therein. For example, if the conventional hydride material 28 has a melting point which is lower than the melting point of the material of the present invention, that material may be added to the molten body of conventional material so as to produce a composite.

While the foregoing description of the present invention was primarily directed to battery systems, the fact that the methods described herein can produce a catalytic material having very small sized catalytic sites is of significance with regard to catalytic materials in general. Materials of the present invention may be regarded as catalytic compositions comprising a matrix having a catalytic nickel material (such as elemental nickel or nickel alloys) supported thereupon. As described hereinabove, the catalytic nickel material is present in the form of particles having a size in the range of 1-15 angstroms, such as a size in the range of 7-12 angstroms, and in particular instances a size of <10 angstroms. Catalysts based upon such very small sized particles were not known in the prior art. Such catalysts of the present invention are very active and may be used in a variety of electrochemical and chemical processes; for example as hydrogenation or reduction catalysts.

The matrix material of such catalysts may comprise the nickel metal hydride alloy and/or the surface interface layer formed thereupon, and in that regard particles, such as particles 24 of FIG. 4A may be used as catalysts. In other embodiments, the matrix material may comprise a secondary material such as carbon. In such instances, a nickel-site rich material of the present invention may be mixed in with a secondary material to form a catalytic composition. In a specific instance a hydrogen storage alloy will be prepared to include the catalytically active channels of the present invention, and this material will then be pulverized and mixed with the secondary matrix material. In other variations of this process, a layer of a metal hydride material may first be deposited onto a support, such as activated carbon, and then treated to form catalytic channels.

In view of the teaching presented herein, yet other methods and techniques for fabricating composites which incorporate materials of the present invention will be readily apparent to those of skill in the art. In any instance, activation of the material of the present invention to form the catalytically active channels may take place either before or after they are incorporated into composites or catalysts with further materials.

There are a number of modifier elements which may be used in the practice of the present invention, and it is generally believed that the modifier elements operate to promote the formation of the catalytic channels by fostering preferential corrosion of the oxide in a pattern corresponding to the channels. The most effective modifier elements will manifest relatively high solubilities in the alkaline electrolyte of the metal hydride battery. The typical metal hydride battery electrolyte has a pH of approximately 15, and a typical solubility of the oxidation product of a modifier element of the present invention in such electrolytes will be at least $1\times10^6$ M. For example, such quantities for $SiO_3^{2-}$, $H_3V_2O_7^-$, $HMoO^{4-}$, $SnO_3^-$, and $SbO_3^-$, are $9.1\times10^6$, $1.3\times10^{12}$, $5.0\times10^{11}$, $2.0\times10^6$, $1.7\times10^{11}$, respectively. It is further believed that highly effective modifier elements also tend to produce monovalent ions in solution. One particular modifier element having utility in the present invention comprises silicon. Some other modifier elements will include Mo, Y, Sn, and Sb. Choice of modifier element will depend at least in part on the composition of the specific alloy being utilized and/or the composition of the electrolyte. While some particular modifier elements are discussed herein, yet other modifier elements will be readily apparent to those of skill in the art in view of the teaching presented herein regarding solubility properties and the operation of the modifiers.

Also, it is to be understood that the modifier elements may be used singly or in combination, and particular alloy materials may include one or more modifier elements. Typically, the modifier elements are present in relatively small amounts in the alloys. In particular instances, the modifier element or elements are present in amounts of at least 0.1 atomic percent and will comprise no more than 10 atomic percent of the alloy material, and in some specific instances will comprise no more than 5 atomic percent of the alloy.

While not wishing to be bound by speculation, it is believed that the modifier elements may substitute for one or more of the elements of the basic $AB_x$ alloy material and, in particular, for the B element of the alloy. For example, in nickel-based materials, it is believed that modifier element silicon, which has an electronegativity of 1.90, which is similar to that of nickel (1.91), can substitute for nickel at the B site in the alloy. The metallic radius of silicon (1.669 angstroms) in alloys of this type is between that of Ti (1.614 angstroms) and Zr (1.771 angstroms), and much larger than those of common B-site elements such as Ni (1.377 angstroms), Co (1.385 angstroms), Cr (1.423 angstroms), Mn (1.428 angstroms), and V (1.491 angstroms) which also may allow it to substitute at the A site. Similar relationships will be found to hold for other particular modifier elements as detailed above, and one of skill in the art could readily select appropriate modifier elements for a particular alloy material.

Some typical alloys of the present invention include nickel together with other materials including one or more of titanium, zirconium, vanadium, chromium, cobalt, and aluminum together with modifier elements which may include silicon, tin, molybdenum, yttrium, and antimony. Such materials may comprise $AB_2$ alloys and may be single phase or multiphase alloys. Such alloys may also include $AB_5$ alloys as well as $A_2B_7$ alloys.

EXPERIMENTAL

A series of five $AB_2$ metal hydride alloys were prepared and evaluated in connection with an experimental series illustrating the principles of the present invention. The alloys were of the basic type: $Ti_{1.2}Zr_{21.5}V_{10}Cr_{7.5}Mn_{8.1}C_{8.0}Ni_{32.2-x}Si_xSn_{0.3}Al_{0.4}$ wherein x is in the range of 0 to 4. In these alloys, the Si substitutes for the Ni and in that regard occupies lattice sites otherwise occupied by the Ni. The materials were prepared by an arc melting process as is known in the art. Melting was performed under a continuous argon flow using a non-consumable tungsten electrode and a water cooled copper tray. Before each run, a piece of sacrificial titanium underwent a number of melt/cool cycles so as to reduce residual oxygen concentration in the system. The chemical composition of the thus prepared alloy samples was determined using a Varian Liberty 100 inductively coupled plasma optical emission spectrometer (ICP-OES) in accord with principles known in the art. Microstructure of the alloys was studied utilizing a Philips X'Pert Pro x-ray diffractometer and a JEOL-JSM6320F scanning electron microscope with energy dispersive spectroscopy (EDS) capability. The gaseous phase hydrogen storage characteristics of each sample were measured using a Suzuki-Shokan multi-channel pressure-concentration-temperature (PCT) system. In the PCT analysis each sample was first activated by a 2 hour thermal cycle ranging between 300° C. and room temperature at 25 atm $H_2$ pressure. The PCT isotherms at 30° C. and 60° C. were then measured. AC impedance measurements were conducted using a Solartron 1250 frequency response analyzer with a sine wave of amplitude 10 mV and frequency range of 10 MHz to 10 kHz. Prior to measurements the electrodes were subjected to one full charge/discharge cycle at a 0.1 C rate using a Solartron 1470 cell test galvanostat, discharged to 80% state of charge and then cooled to −40° C.

Table 1 below provides compositional data for the five alloy samples prepared in accord with the foregoing. The table lists the design composition as well as actual composition as measured by ICP.

TABLE 1

Design compositions (in bold) and ICP results in at. %.

|  |  | Ti | Zr | V | Cr | Mn | Co | Ni | Sn | Al | Si | e/a | B/A |
|---|---|---|---|---|---|---|---|---|---|---|---|---|---|
| Si0 | Design | 12.0 | 21.5 | 10.0 | 7.5 | 8.1 | 8.0 | 32.2 | 0.3 | 0.4 | 0.0 | 6.82 | 1.99 |
|  | ICP | 12.0 | 21.5 | 10.0 | 7.5 | 8.1 | 8.0 | 32.2 | 0.4 | 0.3 | 0.0 | 6.82 | 1.99 |
| Si1 | Design | 12.0 | 21.5 | 10.0 | 7.5 | 8.1 | 8.0 | 31.2 | 0.3 | 0.4 | 1.0 | 6.76 | 1.99 |
|  | ICP | 12.0 | 21.3 | 10.1 | 7.5 | 8.2 | 8.0 | 31.4 | 0.3 | 0.4 | 0.7 | 6.77 | 2.00 |
| Si2 | Design | 12.0 | 21.5 | 10.0 | 7.5 | 8.1 | 8.0 | 30.2 | 0.3 | 0.4 | 2.0 | 6.70 | 1.99 |
|  | ICP | 12.2 | 21.4 | 10 | 7.3 | 8.1 | 8.0 | 30.6 | 0.3 | 0.5 | 1.5 | 6.72 | 1.97 |
| Si3 | Design | 12.0 | 21.5 | 10.0 | 7.5 | 8.1 | 8.0 | 29.2 | 0.3 | 0.4 | 3.0 | 6.64 | 1.99 |
|  | ICP | 12.3 | 21.4 | 10.1 | 7.2 | 8.1 | 8.0 | 29.8 | 0.3 | 0.5 | 2.0 | 6.66 | 1.96 |
| Si4 | Design | 12.0 | 21.5 | 10.0 | 7.5 | 8.1 | 8.0 | 28.2 | 0.3 | 0.4 | 4.0 | 6.58 | 1.99 |
|  | ICP | 12.2 | 21.5 | 10.2 | 7.5 | 8.1 | 8.0 | 28.4 | 0.3 | 0.5 | 3.2 | 6.59 | 1.96 |

Figure 6:
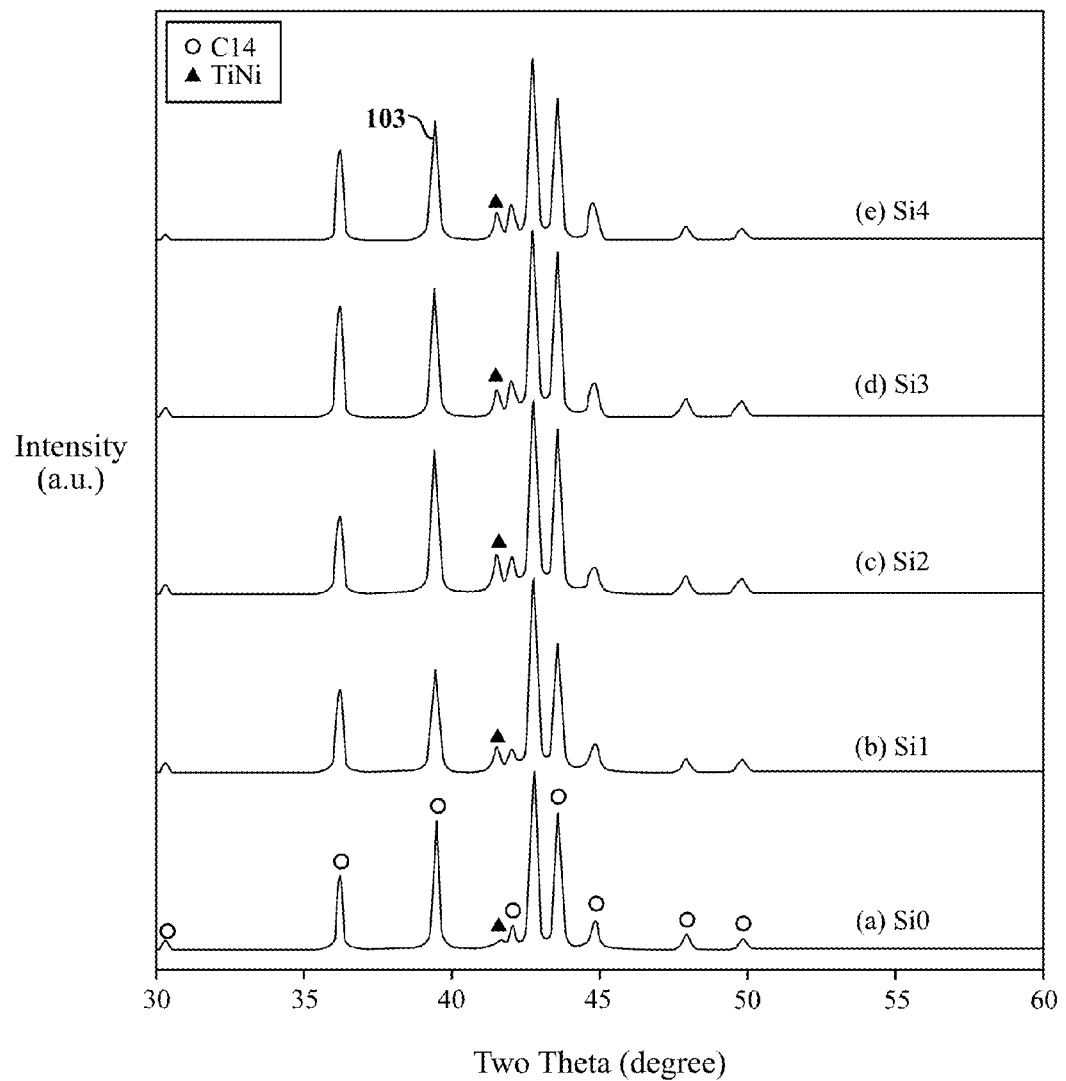
FIG. 6 is a graph showing x-ray diffraction data patterns for a group of materials prepared in accord with the present invention.
Figure 7:
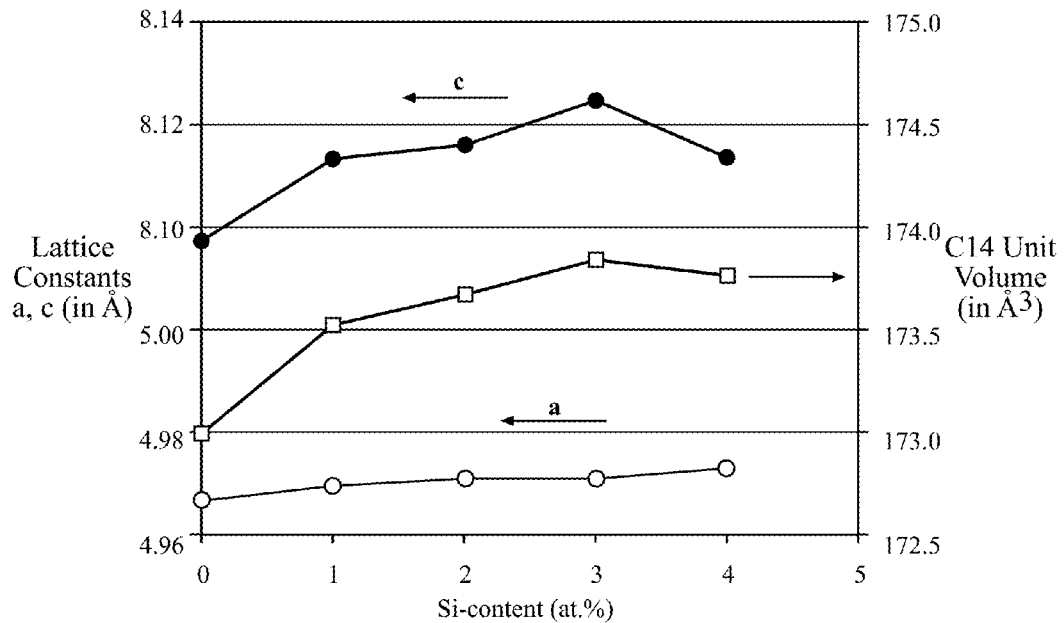
FIG. 7 is a graph showing lattice constants and C14 unit cell volume for the alloys depicted in FIG. 6.

X-ray diffraction patterns for the five alloys are shown in FIG. 6. All of the major peaks can be fitted into a hexagonal C14 ($MgZn_2$) structure. The peak at around 41.5° corresponds to a B2-structured TiNi secondary phase which is a precursor of further solid-state transformation into $Zr_xNi_y$ secondary phases. As will be seen from FIG. 1, the TiNi phase is more prominent in the Si-containing alloys. The lattice contents of the C14 structure, a and c, calculated from the x-ray diffraction patterns are listed in Table 2 and are plotted in FIG. 7 as a function of silicon content.

TABLE 2

Lattice constants a and c, a/c ratio, C14 lattice volume, full widths at half maximum (in degree of 2) for (103) reflection peak, and corresponding crystallite sizes from XRD analysis of alloys Si0 to Si4.

|  | a, Å | c, Å | a/c | $V_{C14}$, Å$^3$ | FWHM(103) | Crystallite Size, Å | C14 Abundance, % | C15 Abundance, % | TiNi Phase Abundance, % |
|---|---|---|---|---|---|---|---|---|---|
| Si0 | 4.9667 | 8.0974 | 0.613 | 172.99 | 0.199 | 634 | 96.7 | 3.1 | 0.2 |
| Si1 | 4.9695 | 8.1132 | 0.613 | 173.52 | 0.254 | 436 | 93.9 | 3.4 | 2.7 |
| Si2 | 4.9708 | 8.1158 | 0.613 | 173.67 | 0.260 | 423 | 91.7 | 4.6 | 3.7 |
| Si3 | 4.9706 | 8.1245 | 0.612 | 173.84 | 0.242 | 467 | 92.3 | 4.6 | 3.1 |
| Si4 | 4.9729 | 8.1134 | 0.613 | 173.76 | 0.233 | 494 | 92.0 | 5.0 | 3.0 |

As the amount of silicon increases, both a and c increase due to the larger atomic radius of Si compared to that of the substituted-for Ni, and this is an indication of the fact that Si occupies the B-site in the crystalline structure of the alloy at least in part. However, it will be noted that the lattice constant c of the higher concentration Si4 alloy does not follow this increasing trend. While not wishing to be bound by speculation, Applicant concludes that as the Si content of the alloys increases, some Si may start to occupy the A-site and reduce the lattice size of the alloy slightly. The C14 unit cell volume of each alloy was calculated from the lattice constants and is also listed in Table 2 and plotted in FIG. 7. As will be noted from this data, as the Si content of the alloys varies, the a/c aspect ratio does not change; therefore, such alloys will not demonstrate any adverse effects from the presence of Si on pulverization during cycling.

The crystallite size of each alloy was estimated by use of the Scherrer equation and is listed in Table 2. It will be noted that the crystallite sizes of the Si-containing alloys are similar to, and smaller than, that of the Si-free alloy, and this may be due to an increase in the density of the TiNi secondary phase. Table 2 also lists the phase abundances of the alloys. As will be seen, the addition of Si to the alloy formulation increases the C15 phase abundance slightly. While both phases are capable of storing large amounts of hydrogen, the one with the weaker hydrogen-metal bond strength ($AB_{2-1}$ with a relatively lower V content and C15 structure) will act as a catalyst phase while the other will act as the main storage phase. These phases act in synergy during hydrogen absorption/desorption as is reflected by the HRD performance of these alloys.

The discharge capacity of each of the alloys was measured in a flooded-cell configuration against the partially pre-charged $Ni(OH)_2$ positive electrode. No alkaline pretreatment was applied before the half-cell measurement. Each sample electrode was charged at a constant current density of 50 $mAg^{-1}$ for 10 hours and then discharged at a current density of 50 $mAg^{-1}$ followed by two pulls at 12 and 4 $mAg^{-1}$. It was found that within three cycles all alloys reached stabilized capacities, and it was found that there is a boost in capacity when Si is added to the alloys at lower levels. Capacities eventually decrease as silicon content increases. It is believed that the capacity boost resultant from incorporation of approximately 1 to 3 atomic percent silicon in the alloys is a result of an increase in the surface area of the alloys upon activation, which makes the storage phase in the alloy more accessible by eliminating the funneling effect. The increase in surface area is believed to be a result of the fact that silicon and its oxides have a greater solubility in the electrolyte than do the other components of the alloy.

Figure 8:
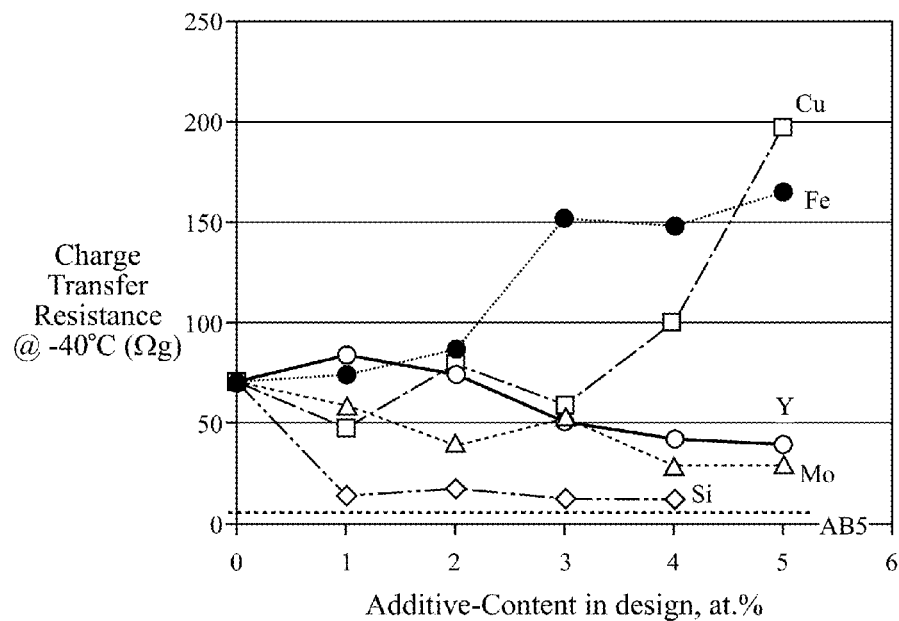
FIG. 8 is a graph of charge transfer resistance as a function of the content of various additives in a series of hydride alloy materials.
Figure 9:
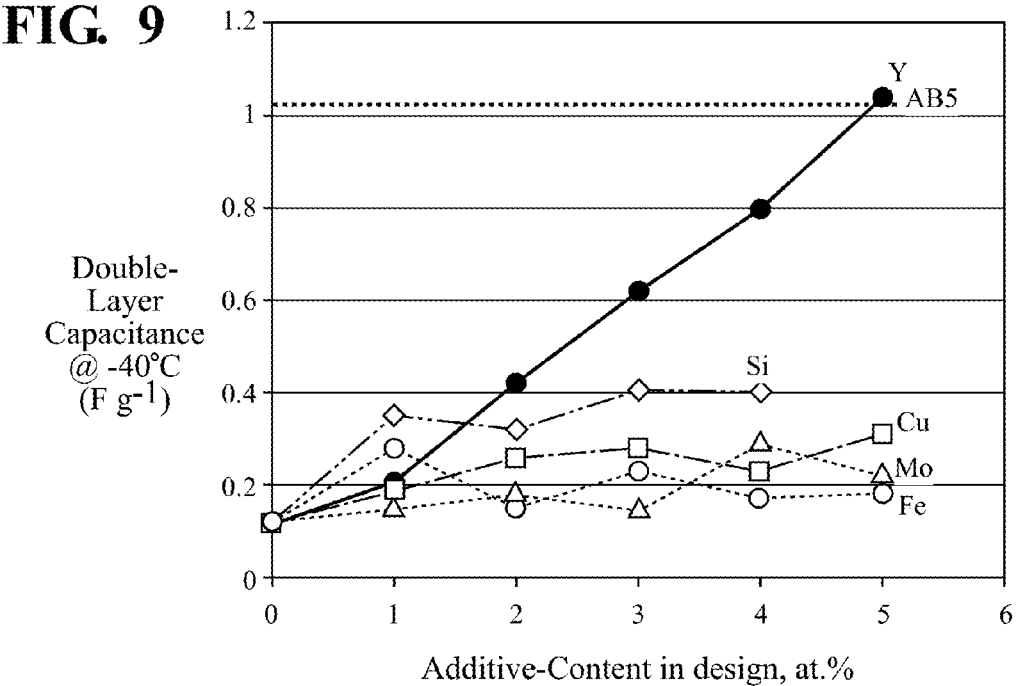
FIG. 9 is a graph showing double layer capacitance as a function of additive content for the materials of FIG. 8.

The temperature characteristics of the alloys were evaluated through the use of AC impedance measurements conducted at −40° C. FIG. 8 is a Cole-Cole plot showing the charge transfer resistance of alloy materials as a function of additive content. In this plot, $AB_5$ materials are considered the benchmark. As will be seen, addition of a silicon additive reduces charge transfer resistance by a factor of at least 5. FIG. 9 is a graph showing the double layer capacitance of the alloys as a function of additive content, and it will be seen that double layer capacitance increases by at least a factor of 3 as a result of silicon addition; and as is understood, this increase is proportional to the reactive surface area of the alloy materials which, as discussed above, is believed to be a result of an increase in surface area attributable to the solubility of the silicon.

Figure 10:
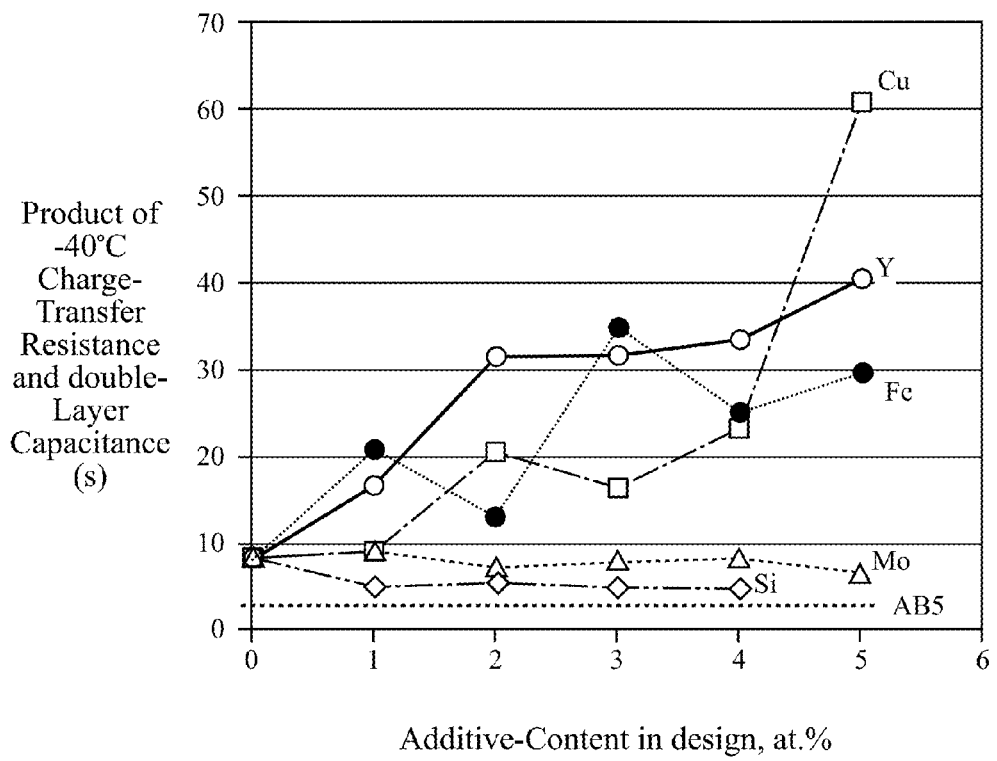
FIG. 10 is a graph of the product of the charge transfer resistance and double layer capacitance of the materials of FIGS. 8 and 9 demonstrating the catalytic ability thereof.

FIG. 10 is a graph depicting the product of charge transfer resistance and double layer capacitance as a function of additive content, and as such summarizes the data of FIGS. 8 and 9. As will be seen from FIG. 10, inclusion of the silicon additive increases the catalytic activity of the alloy with regard to electrochemical activity by a factor of more than 20%. The increase in catalytic activity and/or the increase in surface area of the alloy as a result of the inclusion of the modifier greatly enhances the performance of the alloy particularly at low-temperature conditions.

Figure 11:
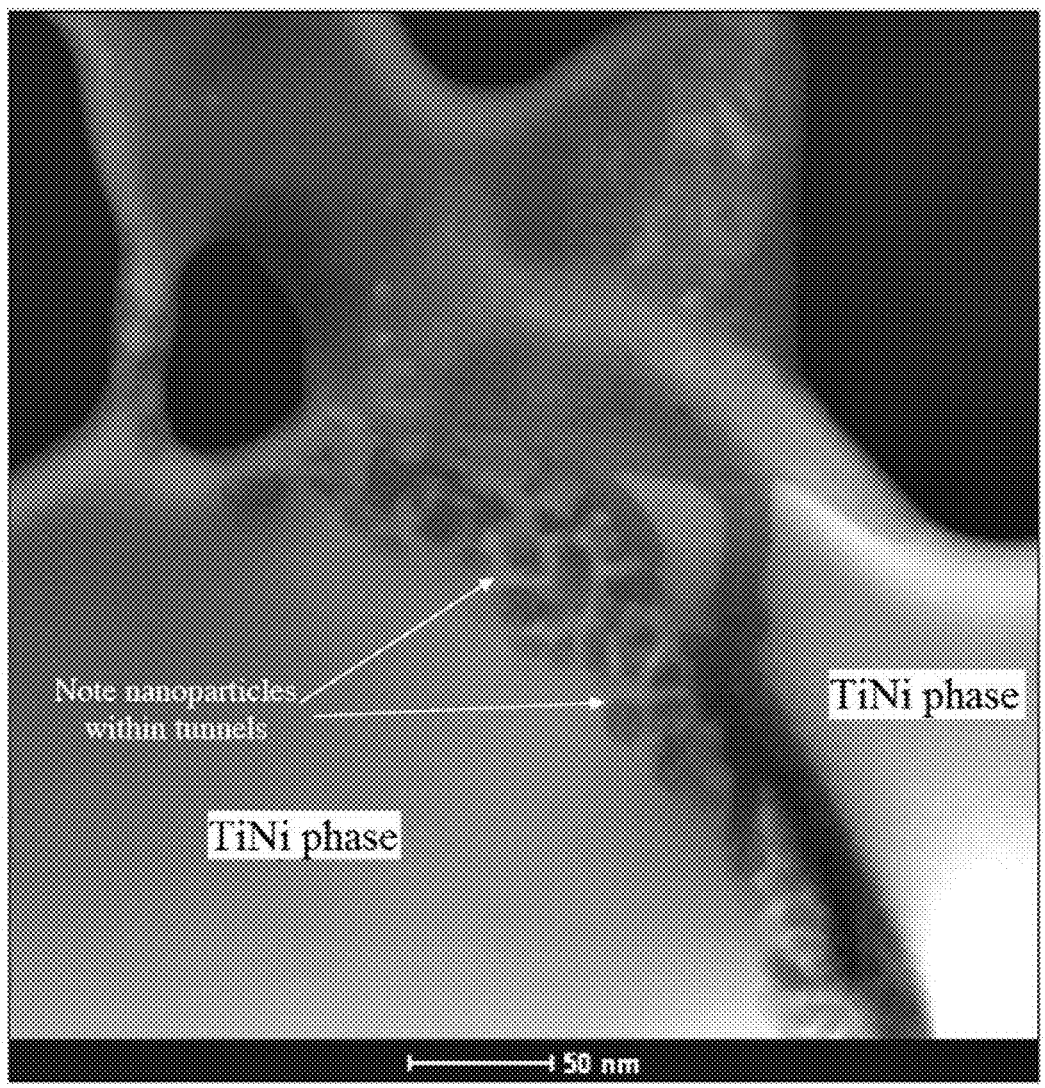
FIGS. 11 and 12 are Transmission Electron Micrographs showing the structure of two different portions of the surface oxide layer of a material of the present invention.
Figure 12:
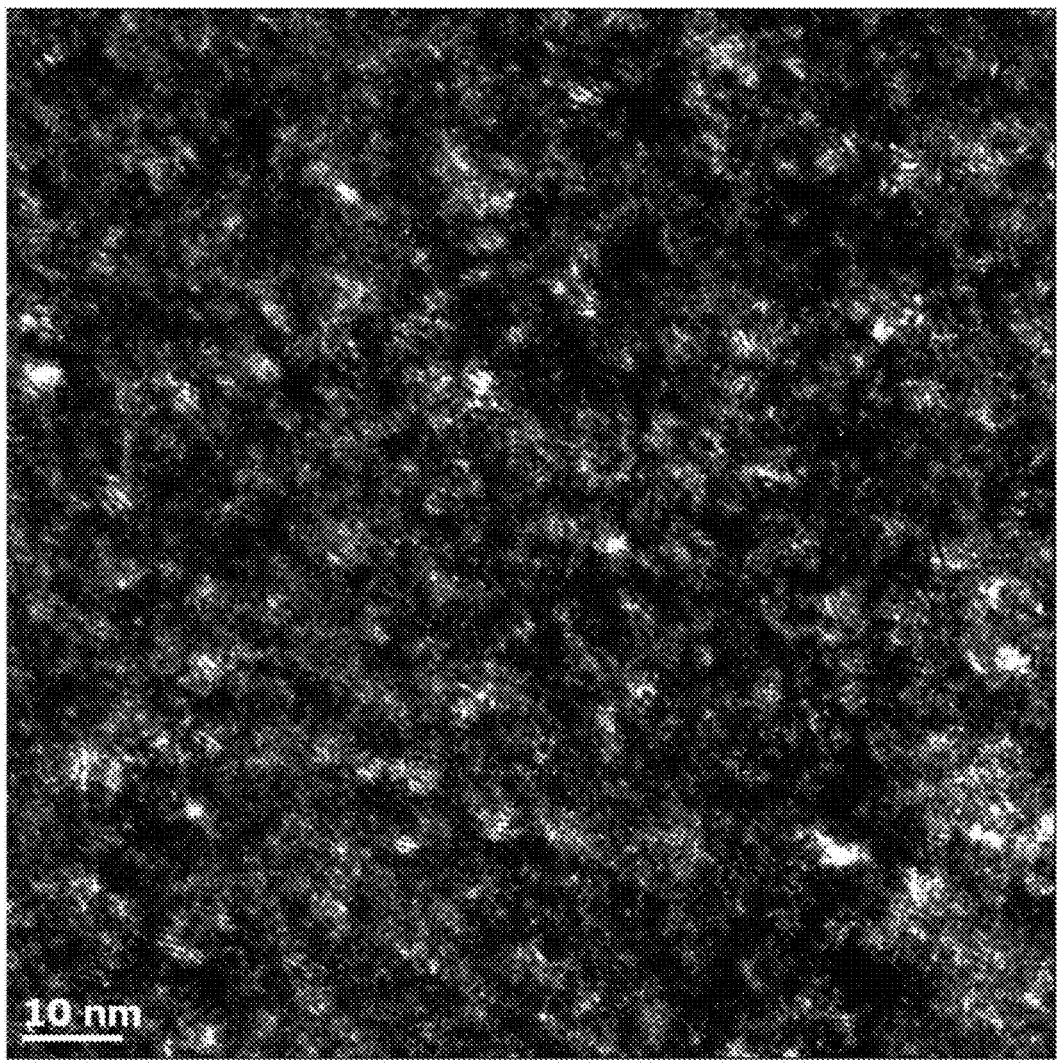

The microstructure of the alloys of the present invention was also verified by Transmission Electron Microscopy (TEM), as is shown in FIGS. 11 and 12. The analysis was carried out on silicon modified alloys of the type described above and showed that two different types of surface oxide were present. FIG. 11 is a TEM micrograph taken from the oxide region between two TiNi secondary phase grains. FIG. 11 shows the three dimensional, interconnected structure of the channels, which are formed in the surface interface layer which is primarily based on oxides of Zr and Ti. FIG. 11 also clearly shows the Ni metallic nanoparticles lining the channels. The other type of oxide can be seen from FIG. 12, which is a TEM micrograph taken on the surface of a TiNi phase. This figure shows the surface oxide to be composed of metallic Ni inclusions (bright lattice image), voids (dark region), and oxide from other elements (grey region). The Ni inclusions found here can be as small as 15-25 angstrom.

While the foregoing experimental series was directed to a particular family of alloys and to use of a particular modifier, namely silicon, it is to be understood that in view of the teaching presented herein, one of skill in the art could readily select other modifier elements based upon their solubility in electrolyte systems and their ability to substitute for components of a particular alloy system, so as to achieve the benefits of the present invention.

In view of the foregoing, it is to be understood that other modifications and variations of the present invention may be implemented. The foregoing drawings, discussion, and description are illustrative of some specific embodiments of the invention but are not meant to be limitations upon the practice thereof. It is the following claims, including all equivalents, which define the scope of the invention.

The invention claimed is:

1. A catalyst powder, comprising:
a support matrix characterized by the presence of metallic catalytic nickel particles having an average particle size of 5-15 angstroms distributed therethroughout, said matrix being formed from an $AB_2$ type hydrogen storage material including Ni and a modifier element comprising Si, wherein said Si substitutes for a portion of said Ni at the B site in said $AB_2$ type alloy.

2. A catalyst powder as in claim 1, wherein the average particle size is 7-12 angstroms.

3. A catalyst powder as in claim 1, wherein the nickel particles are nickel alloys.

4. A catalyst powder as in claim 1, wherein the proximity between adjacent particles is about 300 angstroms.

5. A catalyst powder as in claim 1, further comprising carbon.

6. A catalyst powder as in claim 1, wherein said catalytic particles are graded within said support matrix, said particles being graded in at least one property selected from the group consisting of composition, concentration and size.

7. A catalyst powder as in claim 1, wherein said catalytic particles are uniformly distributed throughout the support matrix.

8. A catalyst powder as in claim 1, wherein said nickel particles lack platinum and palladium.

9. A catalyst powder as in claim 1, wherein said support matrix includes at least one metal oxide.

10. A catalyst powder as in claim 9, wherein said metal oxide comprises at least one element selected from the group consisting of Ni, Co, Mn, Ti, Zr, Fe, and the rare earth elements.

11. A catalyst powder as in claim 1, wherein said catalytic particles are formed by leaching at least a substantial portion of a bulk material, said bulk material including the leached elements.

12. A catalyst powder as in claim 11, wherein said particles and said support matrix form at least 50% of the volume of said catalyst powder.

13. A catalyst powder as in claim 1, wherein said AB2 type alloy has the general formula: $Ti_{12}Zr_{21.5}V_{10}Cr_{7.5}Mn_{8.1}Co_8Ni_{32.2-x}Si_xSn_{0.3}Al_{0.4}$ wherein x has a value in the range of 1-4.

* * * * *